United States Patent
Zaleski et al.

(10) Patent No.: US 12,093,166 B2
(45) Date of Patent: Sep. 17, 2024

(54) SYSTEMS AND METHODS FOR AUTOMATING TEST AND VALIDITY

(71) Applicant: Applause App Quality, Inc., Framingham, MA (US)

(72) Inventors: Jonathan W. Zaleski, Cedar Creek, TX (US); Robert S. Mason, Uxbridge, MA (US); Leonardo Covarrubias, Franklin, MA (US)

(73) Assignee: Applause App Quality, Inc., Framingham, MA (US)

( * ) Notice: Subject to any disclaimer, the term of this patent is extended or adjusted under 35 U.S.C. 154(b) by 94 days.

(21) Appl. No.: 17/678,324

(22) Filed: Feb. 23, 2022

(65) Prior Publication Data

US 2022/0269586 A1    Aug. 25, 2022

Related U.S. Application Data

(60) Provisional application No. 63/153,042, filed on Feb. 24, 2021.

(51) Int. Cl.
*G06F 11/36*    (2006.01)

(52) U.S. Cl.
CPC ...... *G06F 11/3664* (2013.01); *G06F 11/3688* (2013.01)

(58) Field of Classification Search
CPC .................. G06F 11/3664; G06F 11/3688
(Continued)

(56) References Cited

U.S. PATENT DOCUMENTS 8,230,267 B2 * 7/2012 Noller ................. G06F 11/3688
714/45
9,053,242 B2 * 6/2015 Smith ................. G06F 11/3688
(Continued)

FOREIGN PATENT DOCUMENTS

| CN | 109960642 A | * | 7/2019 | .......... G06F 11/3664 |
| CN | 107193734 B | * | 1/2021 | .......... G06F 11/3684 |
| CN | 112214404 A | * | 1/2021 | |

OTHER PUBLICATIONS

CN-112214404-A—Text Translation (English); CN-107193734-B—Text Translation (English); CN-112214404-A—Text Translation (English).*

*Primary Examiner* — Francisco J Aponte
(74) *Attorney, Agent, or Firm* — Wolf, Greenfield & Sacks, P.C.

(57) ABSTRACT

A test automation system is provided that enables "codeless" code test generation and execution. Various embodiments allow users to create automation tests, sets variables in test scripts, set validation criteria, etc. all without having to write code for the operation being tested. In some examples, the system is configured to provide access to mobile device emulation based on selection of or from any number of mobile devices. By automatically defining a suite of tests that can be run on a mobile device population, automated testing can improve validation of any developed software, functionality, and identification of test failures over many existing approaches. Once the codeless tests are created on the system, they can be scheduled to run repeatedly, periodically, a-periodically, all without supervision. Any errors can be communicated to the user, with recommendations to resolve, re-test, among other options.

22 Claims, 18 Drawing Sheets

(58) Field of Classification Search
USPC .......................................................... 717/125
See application file for complete search history.

(56) References Cited

U.S. PATENT DOCUMENTS

| | | | |
|---|---|---|---|
| 9,563,544 B2* | 2/2017 | Mecke ................ G06F 11/3684 |
| 9,697,110 B1* | 7/2017 | Arkadyev ............ G06F 11/3696 |
| 9,916,231 B2* | 3/2018 | Lundstrom ......... G06F 11/3688 |
| 9,928,151 B1* | 3/2018 | Rodriguez Valadez ..................... G06F 11/26 |
| 10,149,189 B2* | 12/2018 | Ross ................ H04M 1/72463 |
| 10,157,122 B1* | 12/2018 | Gohil .................. G06F 11/3684 |
| 10,158,552 B2* | 12/2018 | Doshi .................. H04L 67/303 |
| 10,169,189 B2* | 1/2019 | Ekambaram ........ G06F 11/3684 |
| 10,248,546 B2* | 4/2019 | Ekambaram ........ G06F 11/3672 |
| 10,305,758 B1 | 5/2019 | Bhide et al. |
| 10,579,507 B1* | 3/2020 | Lounibos ............ G06F 3/04842 |
| 10,642,721 B2* | 5/2020 | Kulkarni ............. G06F 11/3688 |
| 10,776,252 B1* | 9/2020 | Weiss ................ G06F 11/3684 |
| 10,853,232 B2* | 12/2020 | Henry ................ G06F 11/3692 |
| 10,860,461 B2* | 12/2020 | Mevorach ........... G06F 11/3644 |
| 11,023,363 B2* | 6/2021 | Lloyd ................ G06F 11/3438 |
| 11,086,765 B2* | 8/2021 | Mukherjee .......... G06F 11/3692 |
| 11,243,866 B1* | 2/2022 | Ramamoorthy .... G06F 11/3006 |
| 11,288,177 B2* | 3/2022 | Balakrishnan ...... G06F 11/3688 |
| 11,327,875 B2* | 5/2022 | Poulin .................... G06F 30/20 |
| 2014/0132571 A1* | 5/2014 | Zeng ................... G06F 11/3688 345/178 |
| 2015/0074648 A1 | 3/2015 | Tal et al. |
| 2015/0095890 A1 | 4/2015 | Clair et al. |
| 2016/0026560 A1* | 1/2016 | Jackson ................ H04W 4/029 714/38.1 |
| 2016/0044520 A1* | 2/2016 | Iyer ....................... H04W 24/08 370/252 |
| 2016/0378618 A1 | 12/2016 | Cmielowski et al. |
| 2017/0262130 A1* | 9/2017 | Lloyd ................ G06F 11/3664 |
| 2017/0329699 A1 | 11/2017 | Adinarayan et al. |
| 2017/0337116 A1* | 11/2017 | Negara ............... G06F 11/3636 |
| 2018/0084047 A1* | 3/2018 | Hao .................... G06F 11/3688 |
| 2018/0189170 A1* | 7/2018 | Dwarakanath ....... G06V 30/153 |
| 2018/0196731 A1* | 7/2018 | Moorthi .................... G06F 8/71 |
| 2018/0365133 A1* | 12/2018 | Mitchell .................... G06F 8/71 |
| 2019/0227917 A1* | 7/2019 | Henry ................ G06F 11/3688 |
| 2019/0294528 A1 | 9/2019 | Avisror et al. |
| 2020/0034281 A1* | 1/2020 | Hamid ................ G06F 11/3684 |
| 2020/0133829 A1* | 4/2020 | Zazo ................... G06F 11/3692 |
| 2020/0174917 A1* | 6/2020 | Patel ........................ G06F 8/42 |
| 2020/0379889 A1* | 12/2020 | Hamid ................ G06F 11/3692 |
| 2021/0081308 A1* | 3/2021 | Golubev ............. G06F 11/3688 |
| 2021/0089436 A1* | 3/2021 | Gangina ............. G06F 11/3672 |
| 2021/0374033 A1 | 12/2021 | Yang et al. |
| 2022/0100632 A1 | 3/2022 | Kulkarni et al. |
| 2022/0342663 A1 | 10/2022 | Barkaee |
| 2023/0130027 A1* | 4/2023 | Mason ................ G06F 11/3692 717/124 |

\* cited by examiner

SYSTEMS AND METHODS FOR AUTOMATING TEST AND VALIDITY

RELATED APPLICATIONS

This Application is a Non-Provisional of and claims priority under 35 U.S.C. § 119(e) to U.S. Provisional Application Ser. No. 63/153,042, filed Feb. 24, 2021, entitled "SYSTEMS AND METHODS FOR AUTOMATING TEST AND VALIDITY," which application is incorporated herein in its entirety.

BACKGROUND

Various approaches exist for facilitating construction, execution, and management of software testing. In spite of many testing services, platforms, and other management tools, test automation and adoption are still lacking and suffer from many flaws, particularly with respect to mobile devices. A significant issue in utilization in testing and automation is the need to customize individual solutions that are not adaptive, and that also require high levels of sophistication to implement.

SUMMARY

Stated broadly various aspects of an automated test system are configured to deliver a "codeless" test suite and/or validation functions that are executable automatically, or guided through selection in a user interface presented to an end user. According to one embodiment, the automated test system can be integrated into a to Digital Quality Platform (DQP). For example, the DQP can provide a comprehensive approach to software testing and software quality that administrators (and their respective brands) need to deliver exceptional digital experiences to their end users, while leveraging fully integrated automated test functionality. In further example, the DQP is configured to combine world-class software products, an enterprise-grade SaaS testing infrastructure, a wide range of digital testing solutions and access to the world's largest community of digital experts to improve testing. Various embodiments deliver this harmonized approach and enable software and system administrators (and respective brand administration) the insights, functionality, and expertise needed to release their digital assets with greater velocity, improved quality review, improved validation, and confidence over conventional implementation. In various embodiments, a test automation suite is integrated into the platform that enables even novice users to review new applications and automatically generate tests to validate application functionality with simple selections in a user interface.

According to various embodiments, the platform can include "codeless" automation components configured to generate automated tests simply and easily regardless of the skill level of the user. In some examples, codeless automation is provided as a SaaS product configured to generate automated tests while users operate their devices. According to various aspects, "codeless" describes implementation that enables unsophisticated users to execute a series of steps on a respective device where the system records the user's operations, selections, navigations, etc., and builds automated test functions and test suites that can be executed against multitudes of real devices. In addition, the test functions and/or test suites can be scheduled to execute automatically against real devices, including continuous, periodic, event based, and/or on-demand testing. In some embodiments, users without any coding knowledge or experience can built test suites and scheduled them to automatically validate existing, new, and/or updated software on, for example, mobile devices. In further embodiments, the created tests/test suites are configured to automatically execute on real devices specified by the user.

According to one embodiment, the automation system is configured to overcome issues associated with conventional test functionality. For example, there are some offerings that enable users to build automated tests and suites by recording activity in a browser setting. However, such browser based functions do not translate into the mobile space, and attempts to provide similar functionality are rife with issues, inconsistent execution, failed execution, and can even induce errors because of the recording processes used. For example, in the mobile setting some conventional approaches rely on accessibility tools and/or extensions in order to capture mobile device activity, which limits the ability to accurately record and/or re-execute the user's actions. Various conventional approaches fail to resolve the challenges associated with the processing required to record mobile device activity, even inducing timing errors as conventional systems attempt to record/replay activity for use in testing.

According to some embodiments, the system is configured to provide access to mobile device emulation, that can be generated on request for a test recording session. The mobile device emulation is configured according to the parameters associated with one or more devices the user selects in the user interface to evaluate. In some examples, the user specifies a software build or application code that they wish to test on the mobile device, and the automation system handles instantiation of the device emulator and loading of the build for test. The automation system displays interfaces showing the selected mobile device and the software executing on the device.

In some examples, the automation system is configured to display screen captures from the mobile device emulation as it is being executed. For example, the emulation of the mobile device can be executed on a backend system or associated processes where any and/or all activity being executed by the software can be recorded in real time, while streaming screen captures of that activity to the user. According to some embodiments, separating recording functionality from rending or streaming of the screen captures enables the automation system to function at normal application speed, and provide an emulation of the software under test that is not delayed due to the recording. Various conventional approaches fail to provide this operation, and further induce errors due to processing delays associated with the recording. In various examples, streaming screen captures back to the user as an initial test session is recorded and executed enables the system to operate without the delays that plague many conventional approaches.

Further embodiments are configured to map user activity being executed in the streamed screen captures to the respective functionality for execution on the emulated device and software. In some examples, the automation system is configured to record all the execution information generated by the emulator including communication logs, execution information, display parameters, display elements, etc., as the user select functions in the display of the emulation. Once the user indicates the test is complete, the system processes the recorded data, object, selection, user identified breaks, etc. into a display of a sequence of operation that form the test. In some embodiments, the underlying code that will be executed when running the test is not shown in the test display. Rather, various embodiments display high level operations or the elements under test, providing a display of the list of functions/operations to be tested or validated and to provide targeted access to edit, update, or re-record within an automatically generated testing sequence. According to various embodiments, the interface is configured to enable the user to automatically update the testing code, insert variables, add validation checks, etc., without the user viewing or even knowing how to update the underlying test code.

According to one aspect, an automated testing system is provided. The system comprises at least one processor operatively connected to a memory, the at least one processor wherein executing configured to accept definition of at least one mobile device and an application to be tested, manage instantiation of at least one recording target matching the definition of the at least one mobile device, wherein the at least one recording target is loaded with the application, execute the application on the at least one recording target, start a recording session of activity performed by the application and the at least one recording target, trigger selections of operations in the application executing on the at least one recording target, responsive to selection made by a user in a testing display communicated from a remote system of the user, stream screen captures of the application under execution for display on the remote system of the user, wherein the stream captures show results of the triggered selections of the application executing on the at least one recording target, and automatically translate the activity performed by the application and the at least one recording target into a sequence of code that when executed replays the recording session against the application.

According to one embodiment, the at least one processor is further configured to, organize a test session into groups of the activity in the activity performed by the application and the at least one recording target based on action elements shown in the display of the at least one recording target and a sequence of execution. According to one embodiment, the at least one processor is further configured to map the groups of the activity to the sequence of code. According to one embodiment, the at least one processor is further configured to enable the user to optimize a recorded session, and replace associated portions of the sequence of code with newly generated translations. According to one embodiment, the at least one processor is further configured to execute a recording or replay session against at least one emulation of the recording target or at least one real device defined by the recording target. According to one embodiment, the at least one processor is further configured to manage execution of the sequence of code against a plurality of real mobile devices loaded with the application.

According to one embodiment, the at least one processor is further configured to define schedules for execution of the sequence of code against a plurality of real mobile devices. According to one embodiment, the at least one processor is further configured to instantiate the at least one recording target responsive to user definition. According to one embodiment, the at least one processor is further configured to present the testing display to the user via a web interface. According to one embodiment, web interface executes without client side installation and without remote control of other test systems. According to one embodiment, the at least one processor is further configured to generate a display of the at least one recording target of the at least one mobile device based on streamed captures from the at least one recording target and a display of a sequence of activity performed on the at least one recording target. According to one embodiment, the system is configured to stream live video based on the streamed captures to the user.

According to one embodiment, the system is configured to tailor streaming of the captures according to a user's bandwidth or a frames per second target. According to one embodiment, the at least one processor is configured to trigger execution of the displayed sequence of activity on at least one real mobile device using at least a portion of the sequence of code associated with a selection within the displayed sequence of activity. According to one embodiment, the at least one processor is further configured to transcribe the recording session into human readable test case steps. According to one embodiment, the at least one processor is further configured to export the recording session as a template for testing. According to one embodiment, the at least one processor is configured to evaluate any software build for accessibility support, based on identification or absence of accessibility locators.

According to one aspect, a computer implemented method for automated testing is provided. The method comprises: accepting, by at least one processor, definition of at least one mobile device and an application to be tested, managing, by the at least one processor, instantiation of at least one recording target matching the definition of the at least one mobile device, wherein the at least one recording target is loaded with the application, executing, by the at least one processor, the application on the at least one recording target, starting, by the at least one processor, a recording session of activity performed by the application and the at least one recording target, triggering, by the at least one processor, selections of operations in the application executing on the at least one recording target, responsive to selection made by a user in a testing display communicated from a remote system of the user, streaming, by the at least one processor, screen captures of the application under execution for display on the remote system of the user, wherein stream captures show results of the triggered selections of the application executing on the at least one recording target, and automatically translating, by the at least one processor, the activity performed by the application and the at least one recording target into a sequence of code that when executed replays the recording session against the application.

According to one embodiment, the method further comprises, organizing, by the at least one processor, a test session into groups of the activity in the activity performed by the application and the at least one recording target based on action elements shown in the display of the at least one recording target and a sequence of execution. According to one embodiment, the method further comprises mapping, by the at least one processor, the groups of the activity to the sequence of code. According to one embodiment, the method further comprises, enabling, by the at least one processor, the user to optimize a recorded session, and replacing, by the at least one processor, associated portions of the sequence of code with newly generated translations. According to one embodiment, the method further comprises executing, by the at least one processor, a recording or replay session against at least one emulation of the recording target or at least one real device defined by the recording target.

According to one embodiment, the method further comprises managing, by the at least one processor, execution of the sequence of code against a plurality of real mobile devices loaded with the application. According to one embodiment, the method further comprises defining, by the at least one processor, schedules for execution of the sequence of code against a plurality of real mobile devices. According to one embodiment, the method further comprises instantiating, by the at least one processor, the at least one recording target responsive to user definition. According to one embodiment, the method further comprises presenting, by the at least one processor, the testing display to the user via a web interface. According to one embodiment, web interface executes without client side installation and without remote control of other test systems. According to one embodiment, the method further comprises generating, by the at least one processor, a display of the at least one recording target of the at least one mobile device based on streamed captures from the at least one recording target and a display of a sequence of activity performed on the at least one recording target. According to one embodiment, the method further comprises streaming, by the at least one processor, live video based on the streamed captures to the user.

According to one embodiment, the method further comprises tailoring, by the at least one processor, streaming of the captures according to a user's bandwidth or a frames per second target. According to one embodiment, the method further comprises triggering, by the at least one processor, execution of the displayed sequence of activity on at least one real mobile device using at least a portion of the sequence of code associated with a selection within the displayed sequence of activity. According to one embodiment, the method further comprises transcribing, by the at least one processor, the recording session into human readable test case steps. According to one embodiment, the method further comprises exporting, by the at least one processor, the recording session as a template for testing. According to one embodiment, the method further comprises evaluating, by the at least one processor, any software build for accessibility support, based on identification or absence of accessibility locators.

Still other aspects, examples, and advantages of these exemplary aspects and examples, are discussed in detail below. Moreover, it is to be understood that both the foregoing information and the following detailed description are merely illustrative examples of various aspects and examples and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF THE DRAWINGS

Various aspects of at least one embodiment are discussed herein with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

DETAILED DESCRIPTION

Figure 1:
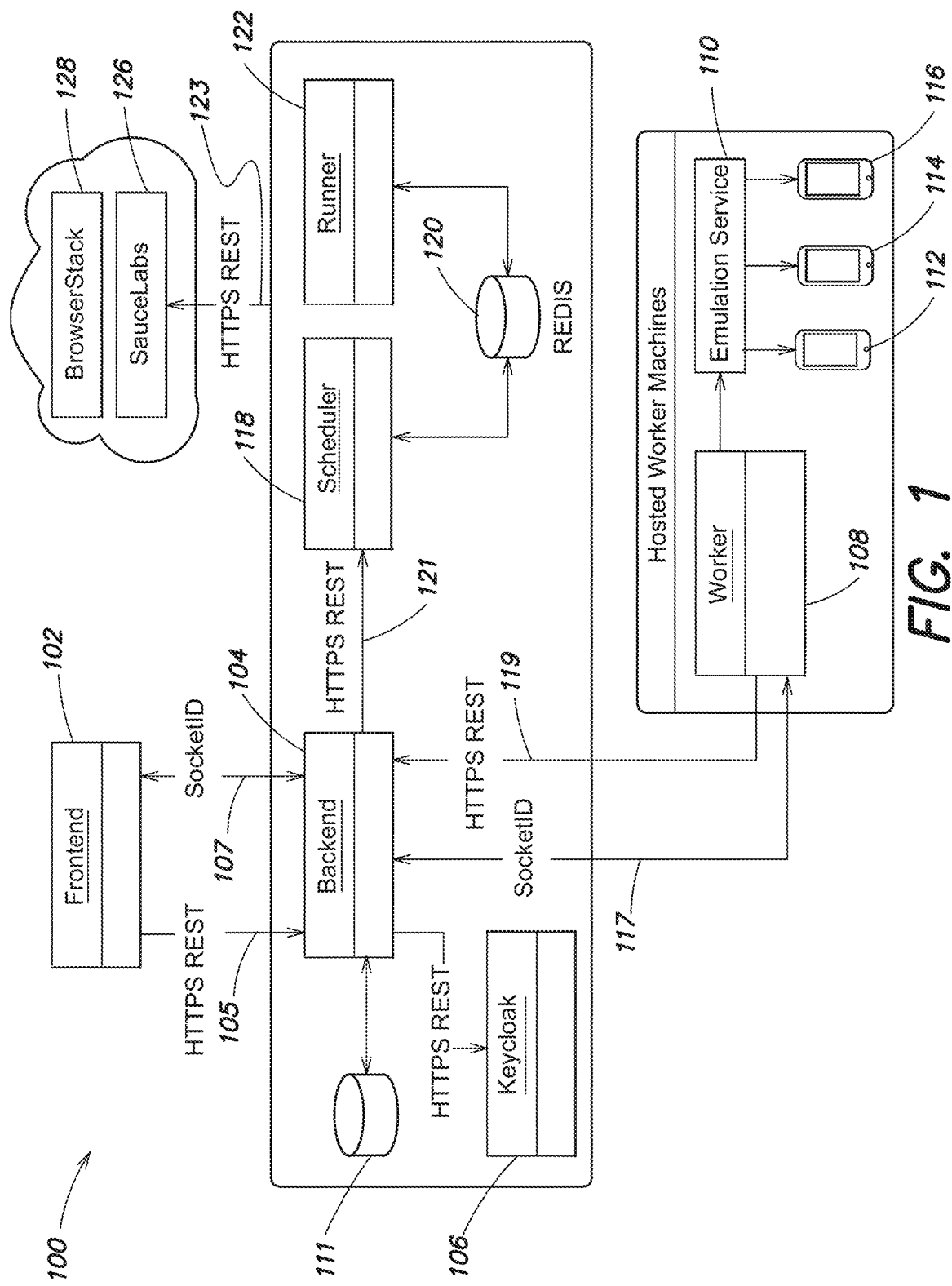
FIG. 1 is a block diagram of an automation systems, according to one embodiment.
Figure 2:
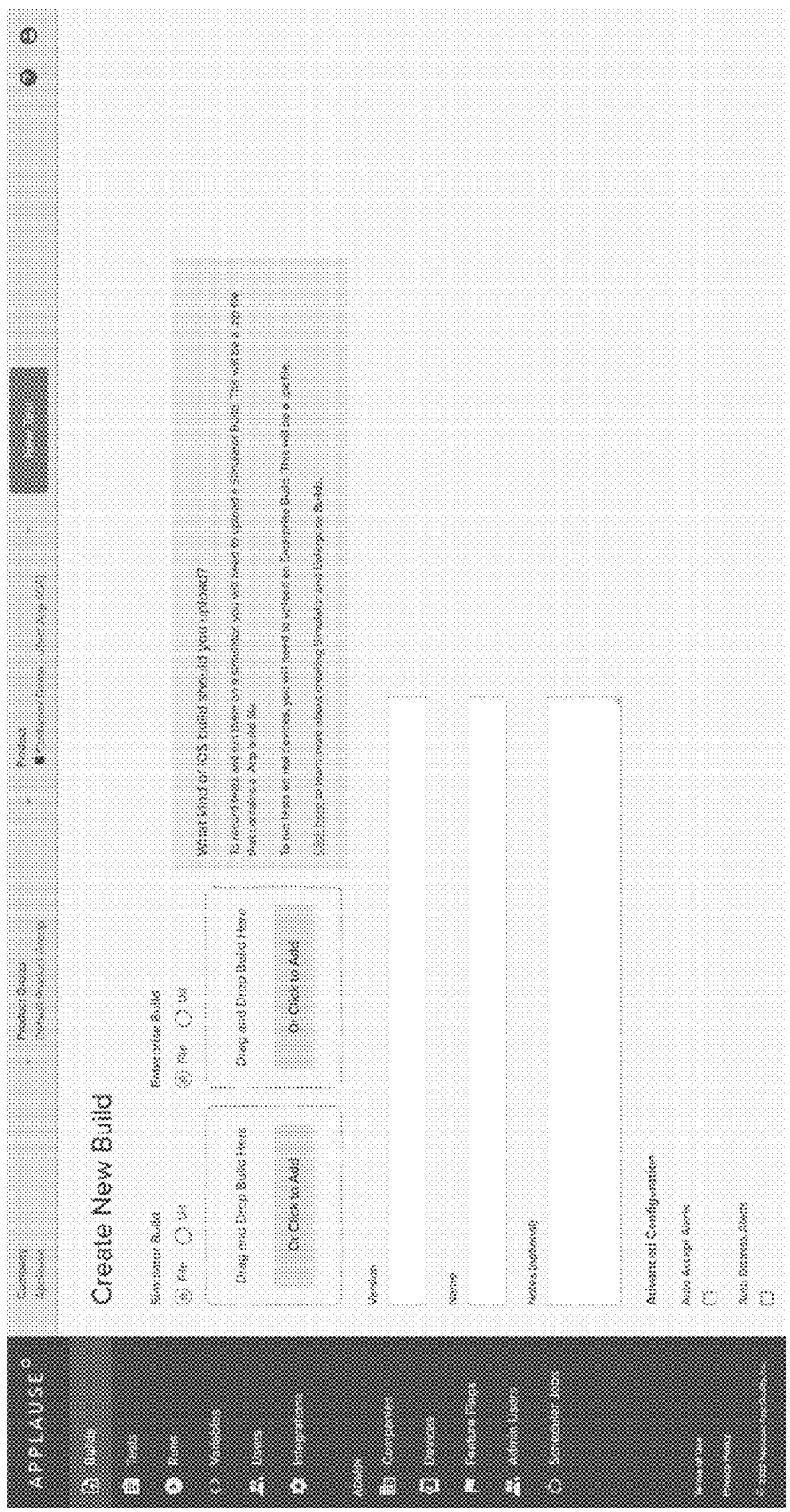
FIG. 2 is an example user interface, according to one embodiment.
Figure 3:
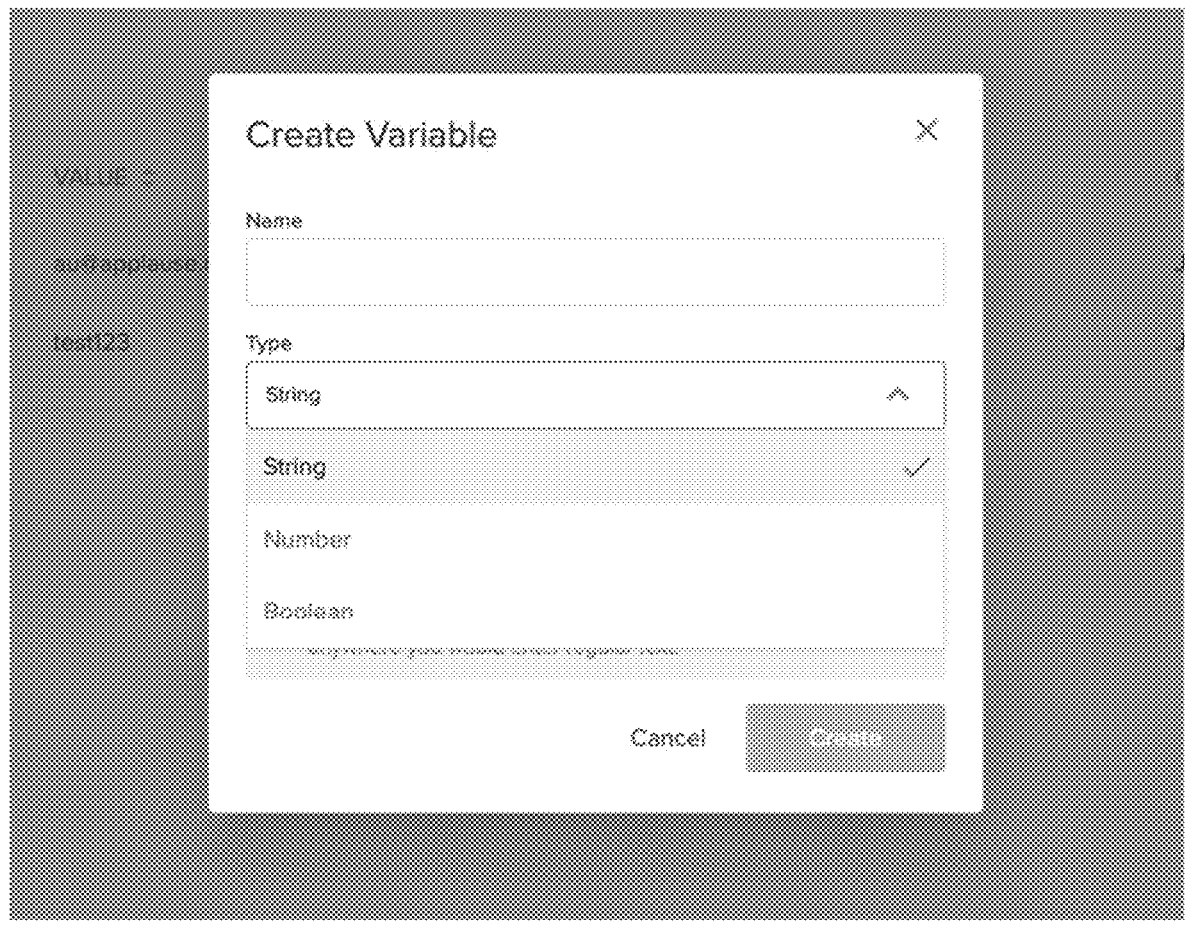
FIG. 3 is an example user interface, according to one embodiment.

According to some aspects, a test automation system is provided that enables "codeless" code test generation and execution. Various embodiments allow users to create automation tests, sets variables in automated tests, set validation criteria, etc. all without having to write code for the operation being tested. In some examples, the system is configured to provide access to mobile device emulation based on selection of or from any number of mobile devices. For example, the automation system enables selection of android or iPhone devices, among other options, which can be further specified according to model, build, etc. By establishing a suite of tests that can be run on a mobile device population, automated testing can improve validation of any developed software, improve validation of existing functionality, and improve identification of test failures over many existing approaches. Once the codeless tests are created on the system, they can be scheduled to run repeatedly, periodically, a-periodically, all without supervision.

Any errors can be communicated to the user, with options to resolve, re-test, among other options.

Various embodiments enable a test recording session that occurs without impacting application performance on a subject mobile device. Further examples are configured to limit test recording impact on application execution to prevent processing or timing issues from impacting test development, execution, and validation. According to some embodiments, additional improvement over conventional approaches is based on using unaltered versions of the devices to be tested. Some known approaches leverage "rooted" or jail-break version of devices in order to capture device activity. Such approaches compromise the security of the underlying device and risk or induce changes in device or application behavior that affects testing, and automated test creation. According to another aspect, the system is configured to utilize devices in an unaltered state, which, for example, ensures a pristine automated test generation and test execution environment. This architecture improves over known approaches and reduces errors in test generation and execution.

In some embodiments, a user can specify any number of devices to test, as well specific parameters for the devices, including software builds. An emulation of the desired device can be displayed for a test recording session. In some embodiments, the system is configured to stream screen captures from the executing emulation to the user rather than provide a remote emulation or emulation instance to be run on the given device. While the user is interacting with the streamed screen captures, the system can be configured to record the activity (e.g., element select, responsive execution, communication stack, etc.) at the emulator. In various embodiments, the system is configured to emulate execution and stream screen captures to the user so that the user need not have any knowledge that they are not interacting directly with a live application under test. In further example, ensuring the users interact with the application under test as if it is live and direct improves the ability of the system to create automated tests that reflect the application as it will be used, including the timing of interactions that users trigger. Further the system can map user selection made on the displayed screen captures to actions at the application/emulator.

According to some embodiments, the recording of the selected operations, underlying operations, responses, and data flows, is then translated in testing code to executed as part of an automation test or test suite. According to one embodiment, the system is configured to translate recorded operations into automated test based on repeating user interface selections made by a user. In order to trigger the same selection made by a user the system can be configured to find a target reference for a place clicked on in an application during a recording session. There are multiple paths the system can use to locate that target element. For example, the system can employ accessibility locators (e.g., where present in an application), but the system is also configured to account for scenarios, environments, and/or application where accessibility locators are not present. In another example, the system is configured to traverse a decoded digital representation (e.g., XML) of a currently displayed screen to generate a relevant path to reference the targeted object/element. In further embodiments, the system is configured to resolve ambiguity using dynamic three dimensional references.

Stated broadly, the relevant path to reference a targeted element/object can be ambiguous because, for example, on any given screen some elements may overlap each other visually, and the generated digital representation does not reflect positional overlap. According to some embodiments, the translation process generates one or more mappings of an X/Y coordinate tap done on a static image to a dynamic 3-dimensional reference. The dynamic 3-dimensional reference is defined to be stable across various device screen sizes and operating system versions— in essence establishing a Z index for positioning. As part of finding a target reference, the system can be configured to determine multiple reference methods (e.g., accessibility locators, decoded digital representation, 3D reference, etc.) for the same target coordinate. In some examples, the system is configured to record multiple reference points and select from the multiple options the best approach. Having multiple access approach improves flexibility of the system, and for example, can preserve fallback access methods should subsequent application builds remove a current access point. According to various embodiment, reference path can be assigned priority, where an accessibility locator is given the highest priority. If a future build removes that accessibility locator, and the system has stored another reference (e.g., XML path-based locator from original recording), the system can still execute the test using the stored XML path-path locator. In one example, the system can note the missing accessibility locator but still continue to execute the test by using the fallback locator.

Other examples translations include operations executed by the system to reflect timing of actions, swipes in mobile device user interface, and other device operations executable on mobile device platforms. In some embodiments, timing of action can be captured for automated test generation. Stated broadly, high fidelity with the speed of the users' interactions and the playback process is a goal when developing a test that recreates the original test approach. Some embodiments are further configured to resolve the issues associated with timing delays that are human based but not necessarily part of a testing scenario. For example, what if the person was just slow or indecisive and that added unnecessary wait times into the test. Perhaps there are times when the user/tester would want to click on an element as soon as it appears. In some embodiments, the backend processing system is configured to infer the desired result by inspecting the element and page and determining if the user was waiting for some dynamic changes on the page (by comparing frames) or just responding slowly during the test recording (e.g., no changes occur during wait period), and optimize the action wait times for most efficient test execution. According to various embodiments, efficient test execution can be important as the real devices tests are executed on are physical and can be limited in number. Thus, in various environments the more efficient the tests execute on real devices, the more efficient and cost effective the system is and the faster they produce results.

According to another example, the system can record swipes on a mobile device screen. The system is configured to record a human finger (or pointer representing a human finger) moving from one two dimensional coordinate to another. As discussed above with accessibility locators, the issue is somewhat similar to the three dimensional problem above, in that each location is translated into a third dimension by the system to permit replay on various screen sizes. For example, a swipe is rarely perfectly linear. The system can be configured to determine an "intent" of the swipe based on inference. The system can determine if the swipe was left→right, right→left, intentionally not linear, etc. Since swipes are coordinate based, the x, y encoding is not well suited with executing tests across devices with different screen sizes. Thus, in some embodiments, the system is configured to convert swipes into paths starting on one detected target element and ending on another detected target element where there are different elements. In the case of large elements (say a picture), the system can be configured to understand the original recording device geometry and swipe points relative to the target execution device geometry. The system can then mathematically adjust the swipe points based on the differences in geometry between the original device and the new target device.

According to some examples, test code can be automatically written by the system to include a replay of the events recorded in the test session. In further embodiments, the execution of the translation is done upon the conclusion of a test session recording. In various embodiments, the level of the recording and processing requirements needed to achieve the recording would degrade application performance if executed in conjunction with test translation and/or potential affect timing. For example, by separating the recording process and translation, and further streaming screen captures of the device emulation/executing application, the system enables a recording session that does not impose delays that trigger test issues or failure.

As discussed, separating test recording and test generation into stages (e.g., recording, translation, etc.), enables the automation system to improve over conventional approaches. For example, the system can be configured to preserve the recording events/screens from any recording session. As the automated test (and underlying code) generation process is a separate stage, the system enables independent improvements in code generation. For example, if there are improved the locators available (e.g., higher priority), the system can re-run the translation with the higher priority locators and can do so without requiring a user to re-record the test. Further, re-recording the test or portions of the test enables further optimizations in the automatic test generation. Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, any combination of, and all of the described terms.

FIG. 1 illustrates a block diagram of an example automation system 100 according to one embodiment. According to one embodiment, the system 100 can include a frontend 102 that users can access to utilize or employ the codeless automation functions. In some embodiments, the front end is configured to control and/or authorize access to the automation system 100 or a DPQ platform that incorporates various test services, functions, evaluations, codeless automation, and can also include third party integrations.

According to some embodiments, the frontend is defined as a web browser with no additions. For example, the frontend can be accesses with no local installation on a user's system. In some examples, the frontend need not even be a full application, rather only interface capability is required. Enable automation testing without requiring local installation, remote desktops, or the like, improves significantly over known test approaches that implement heavy client side applications (including, for example, security concerns for any installer), or remote desktops into the machines running emulators, among other examples.

According to one embodiment, the front end 102 enables access to codeless test functions and is supported by a backend component 104. The system components can be configured to communicate via standardized communication channels (e.g., 105 and 107). For example, the frontend 102 and backend can communicate via REST compliant pathways (e.g., 105) and bi-directional traffic can be managed with low latency bidirectional communication pathways (e.g., SocketIO 107). Identification and/or authentication can be managed by the backend. For example, the back end may be connected to an authentication component or service that manages user enrollment and subsequent authentication. In one embodiment, the system can include the known Keycloak service 106 configured to provide authentication functions. Data on users, tests, device specifications, testing, can be stored in various databases on the system. For example, a Postgres database (e.g., 111) can be used to store information on users, profile information on testing preferences, test results, analytics, third party data, among other options.

In some embodiments, the backend 104 is configured to manage the codeless automation functions. For example, the backend can provide access to test recording sessions (e.g., via, the frontend 102). The backend 104 can be configured to instantiate worker processes on worker machines (e.g., 108) as needed. The worker can be instantiated to control device emulation of various mobile devices, including for example, various ones of iPhone or Android devices that a user may wish to test. In some embodiments, the worker is configured to manage simulator connections, including, for example, setup, cleanup, recovery, app installation (e.g., software build), device screen shot capture, etc. In further embodiments, the system can leverage the test architecture to connect to real devices instead of emulations. Recording sessions can be executed against the real devices and screen captures from the real devices streamed to a user display to permit the user to perceive the real device executing at normal application speeds while a recording session is underway. For example, one or more worker machines can instantiate real devices and install software builds to test/record with the real device instance.

In some examples, a service can be executed to host an emulation instance via an emulation service 110, and each instance of device (e.g., 112-116) can reflect specific device types, model, etc., specified by a user. In one example, the user can test a software build against an Android device emulation, an iPhone device emulation, an iPhone 12 device, an iPhone 11 device, etc. Each device can be presented to the user to interact with an application under test, record the activity, and automatically generate test code based on the recording. In one example, process execution information associated with a displayed element on the mobile device via the application can be used to automatically generate code to replay the same execution loop. Once the code is generated, the system can re-execute that test at any time and on any schedule—which can be done against any variety of device models and operating system versions.

According to some embodiments, the worker 108 can be configured to communicate with the back end via a low latency bidirectional path (e.g., 117). The low latency connection can be provided via many known communication protocols/services, including for example SocketIO. Other communication pathways can be used, for example, to allocate/deallocate via an HTTPS REST API (e.g., 119).

As discussed, authenticated users can access the system to build their own codeless automation test by recording their activity, for example, as they navigate and select functions in an application under test on specified mobile devices (e.g., provided via emulation). In some embodiments, users will access the system via interfaces presented through the front end 102, and specify devices they wish to test (e.g., manufacturer, model, etc.), and an application to be tested by uploading or identifying a software build for each device or multiple devices. Various emulations are spun up based on the user's preference and software build. The user then interacts with the emulation and the system (e.g., backend) records execution information produced by the emulators, including driver requests, OS interactions, inter-process communication, execution information, I/O request, disk and memory requests, communication stack, etc. According to various embodiments, the display shown to the user is based on screen captures that are streamed from the backend/workers (104/108) to the frontend 102. As discussed, the user interacts with screen captures and the frontend captures user activity performed against the display and communicates that activity to the backend so that the application itself then executes the user's desired operation. In some examples, the front end can capture positioning information on a pointing device or touch screen and provide that information to the backend to trigger the actual operation being selected. As screen captures are streamed back the user, the user does not need to be concerned that they are not interacting with the actual application.

Once a user indicates that a recording session is complete or that the test creation is over, the back end can process the recording of the execution activity (e.g., identification of visual elements, associated functions, I/O, and returned communication, etc.) to build code that can be executed to repeat the recorded operations. In some embodiments, the system is configured to process recording and translation in parallel so an end event or trigger is not necessary to execute translation.

In some embodiments, the back end is configured to map recorded operations into lines of code to execute the same function. For example, a selection in a mobile device UI can be recorded and mapped into code by the backend 104. In further example, a user input of a specific value can be mapped into code for selecting the visual element the user selected and code for input of the specific value. In various embodiments, the backend 104 is configured to translate the execution recording into lines of code. For example, the system can be configured to create code for executing the same sequence performed by the user based on the recording. In some embodiments, the system is configured to group or segment the sequence of code based on the functions being executed. In one example, the system can discover elements of the application or display and group the user's actions and associated code based on the sequences that pertain to each element.

In further embodiments, the system is configured to display the test sequence as a set of high level functions associated with each group, and for example, each element of the application and/or display. For example, the system can display a sequence of high level functions in the user interface and provide navigation options that enable the user to selection various functions and/or groups to add variable definitions or validation checks. For example, if the initial sequence tested a user input of a value, the user can select that sequence in the user interface to set a variable that tests entry of a range of values. In another example, the user can add a validation check to the high level function. Validation can include tests to ensure the same execution information results from an operation as was originally recorded. In some examples, the system translates a validation request into a test if true comparison between the recorded operations and the tested operation. In the various examples, the system is configured to edit or add code to reflect the new options selected by the user. In the variable example, the system edits the underlying code to change a fixed input value to a variable and, for example, tests that variable across a range of values. In the later example, the system can add a validation check (e.g., validate display of object, validate object function, validate object return, etc.).

In addition to options to add variables or validation checks, the system is further configured to re-record a test session. In some examples, the user can access display of high level functions to target or focus a re-recording session. The system is configured to record the new user activity, translate the recorded execution information, and replace the old automatically generated code with the newly recorded and automatically generated code. Often there is no difference in the display of the high level functions observed by the user, however, the underlying code can be updated, altered, optimized, regenerated with retained recordings, and/or replaced by re-recording user activity.

According to some embodiments, the codeless automation functions include automatic testing schedules, API triggering, and/or execution of the tests against real devices. According to various aspects, the emulation can be used to develop the test code, execution of the test needs to proceed against real devices. In further embodiments, the user can select multitudes of devices to execute testing against those specific and real devices. As shown in FIG. 1, the backend can communicate a test, multiple tests, test suites, etc. to a scheduler 118 via a standard communication path or API 121 (e.g., https REST). According to some embodiments, the scheduler can store any requested test or test suite as a job to be executed. For example, the scheduler can be linked to a database for managing stored tests for execution. According to another example, the scheduler 118 can populate a REDIS queue/database (e.g., 120) for execution of jobs according to any schedule or defined queue. In further embodiments, the scheduler can post jobs to a REDIS queue that are executed by a runner 122 component. According to some examples, the runner 122 is configured to manage execution of a task/job from the queue via an external platform. The known SAUCELABS and BROWSERSTACK platforms (e.g., 126-128) enable tests to be executed against real devices via API or other communication path (e.g., 123).

The various components and functions described with respect to FIG. 1 can be implemented in other arrangements, and various functions executed by different components, fewer components, etc. The following examples describes operations and functions that can be assigned based on similar configured, however, other embodiments can employ other architecture and segregation of functionality.

Example Components for Codeless Automation

According to one embodiment, the frontend can be provided by a web app configured to enable the user interface functions for the codeless automation environment. Example capabilities include: user login/logout/invites/password reset company/product management; build management; test recording/editing; test scheduling/execution; result reporting; etc. In various examples, the frontend is configured to communicate with the backend over a HTTPS REST API and receives push notifications over SocketIO. According to another embodiment, the backend is configured to manage execution of processing functions of the codeless automation environment, and is further configured to coordinate the connected services. In one example, the backend can eb a node application (e.g., currently Node 14.15 LTS). The backend can be configured to execute the following functions: authenticates with Keycloak; store system state information (e.g., in the database (TIDB)); communicates with other services/components in the environment; and automatic scaling via triggering scaling/load balancing at thresholds and running multiple instances of the backend, among other options.

According to further embodiments, worker processes run on worker machines and can be configured to perform the following functions: on startup, register with the backend via a HTTPS REST API and a license key—(for example, the license key can be a single secret configured into the Worker machine environment); manage incoming authenticated HTTPS connections (e.g., which can be on a particular port (e.g., port 7000) open on the Worker machine); manage requested from the backend to poll status; check available resources; close connections; configure/manage simulators; etc. Worker machines have specific requirements, including for example, for running various operating systems so the system is configured to span multiple operating system types and hosting environments for respective worker processes. According to one example, the system is configured to select iOS hardware for iOS simulators, as you cannot run iOS simulators on anything but Apple hardware. In further example, Android emulators are configured to run on physical hardware that does not interact well on Apple hardware. As discussed, the system is configured to select the respective worker, hardware, and processes needed for any emulation.

In further example, workers can be configured to: configured to provide a device simulator (e.g., an iOS, Android, Google, etc. simulator); manage the simulator connection-setup, cleanup, recovery, app installation, device screenshots, etc.; and manage allocation/deallocation via the backend communicating to worker machines via HTTPS REST API; and can communicate with the backend via HTTPS REST and SocketIO. According to various embodiments, the systems is configured to scale worker machines/workers to meet test requirements (e.g., number of tests, number of devices under test, time limits for test, processor load, etc.).

According to various embodiments, the codeless automation environment can include a scheduler configured to: maintain a schedule of job executions; queues job execution requests into Redis; capture job execution results; and store execution results (e.g., via a separate database that can be used to keep job execution results separate); report on job execution status; queue times; wait times, etc.; and can further be configured to communicate with the backend over HTTPS REST API. According to further embodiments, the codeless automation environment can include a runner instantiated as a generic job runner that can run one or more generated tests on a device provider. In some examples, the job runner is configured to: pull job execution requests off of Redis; run the requested job against the requested target environment, which can include threaded execution, support for multiple execution environments, error handling, concurrency limitations, etc.; fetches/aggregates job execution results; communicates job execution results back to the scheduler (e.g., making the results available to the web-backend or the web-backend directly, among other options. In further examples, the system can include a data-store that is optionally locally accessible to the scheduler service (e.g., where results fetching can be handled independently from test-execution itself). The system can also manage a call to the web-backend for results access, which can be configured to operate over SocketIO or HTTPS REST. The system can be configured to scale any needed resources to maintain testing functions and for example, manage time in queue; queue size, etc. In further example, the runner communicates to external SaaS providers (e.g., SauceLabs and BrowserStack) to execute recorded tests on real devices and simulators using authenticated REST APIs.

To highlight various functions in the system examples of specific communication paths are provided. However, other communication pathways can be used. For example, the communication paths can include: frontend to backend—HTTPS REST & SocketIO (bi-directional); backend to Keycloak—HTTPS REST (token exchange); backend to worker-HTTPS proxy for Appium actions SocketIO (bi-directional); worker to backend—HTTPS REST & SocketIO (bi-directional); backend to scheduler—HTTPS REST; scheduler to redis—redis TLS; and runner to redis—redis TLS, among other options.

FIGS. 2—11 are screen captures from an embodiment of the codeless automation user interface. According to various embodiments, users can access a front end or web application to access and utilize codeless automation. The screen captures highlight functions presented to the end users. For example, the screen captures reflect the displays shown to a user once the system has executed a mapping session and installed an API demo onto a device emulator that will enable the user to act on graphics of the loaded application (e.g., click on the emulator display to record test functions). As discussed above, the system streams screen captures from the application under test to the user and can map operations the user takes on the screen captures to functions in the application.

Figure 4:
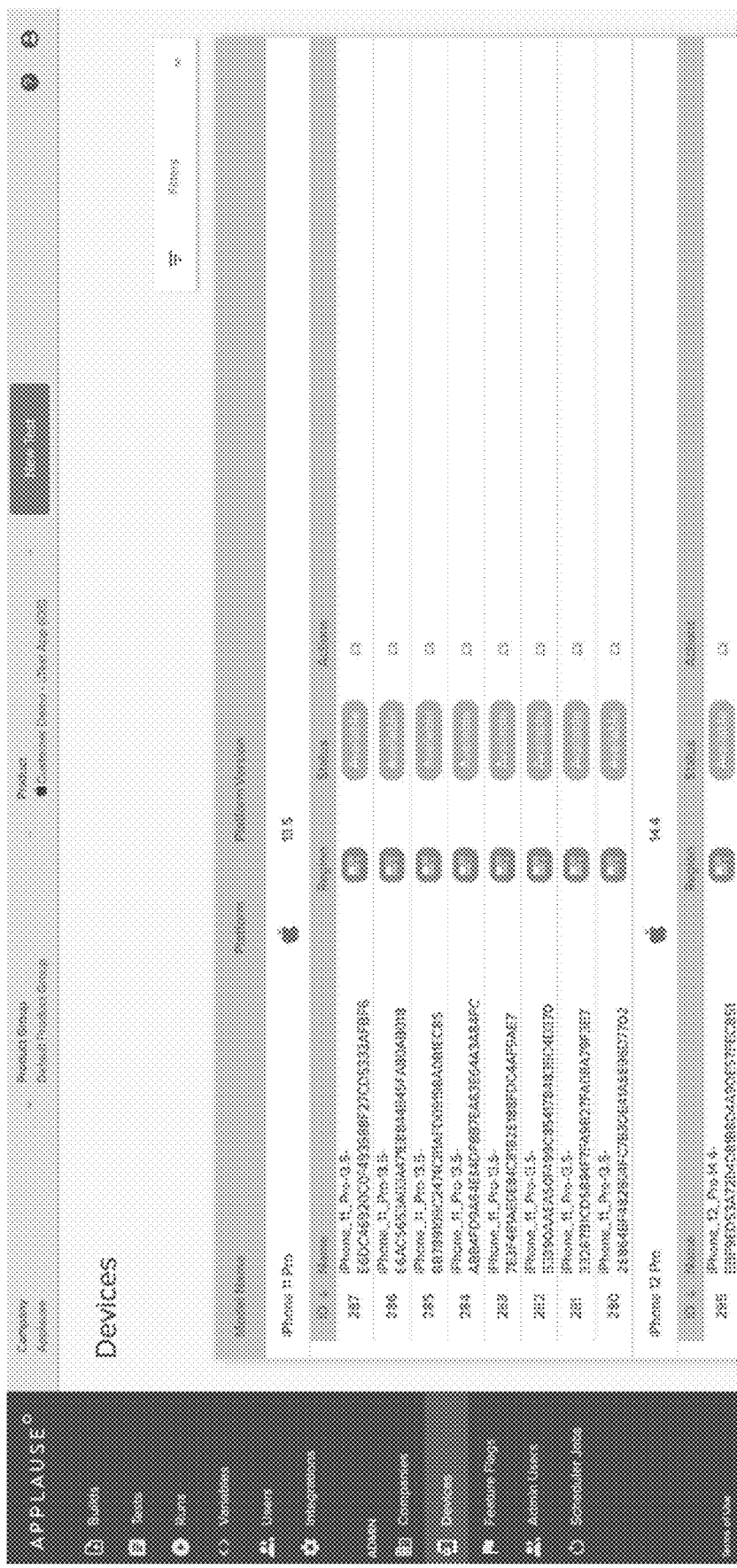
FIG. 4 is an example user interface, according to one embodiment.
Figure 5:
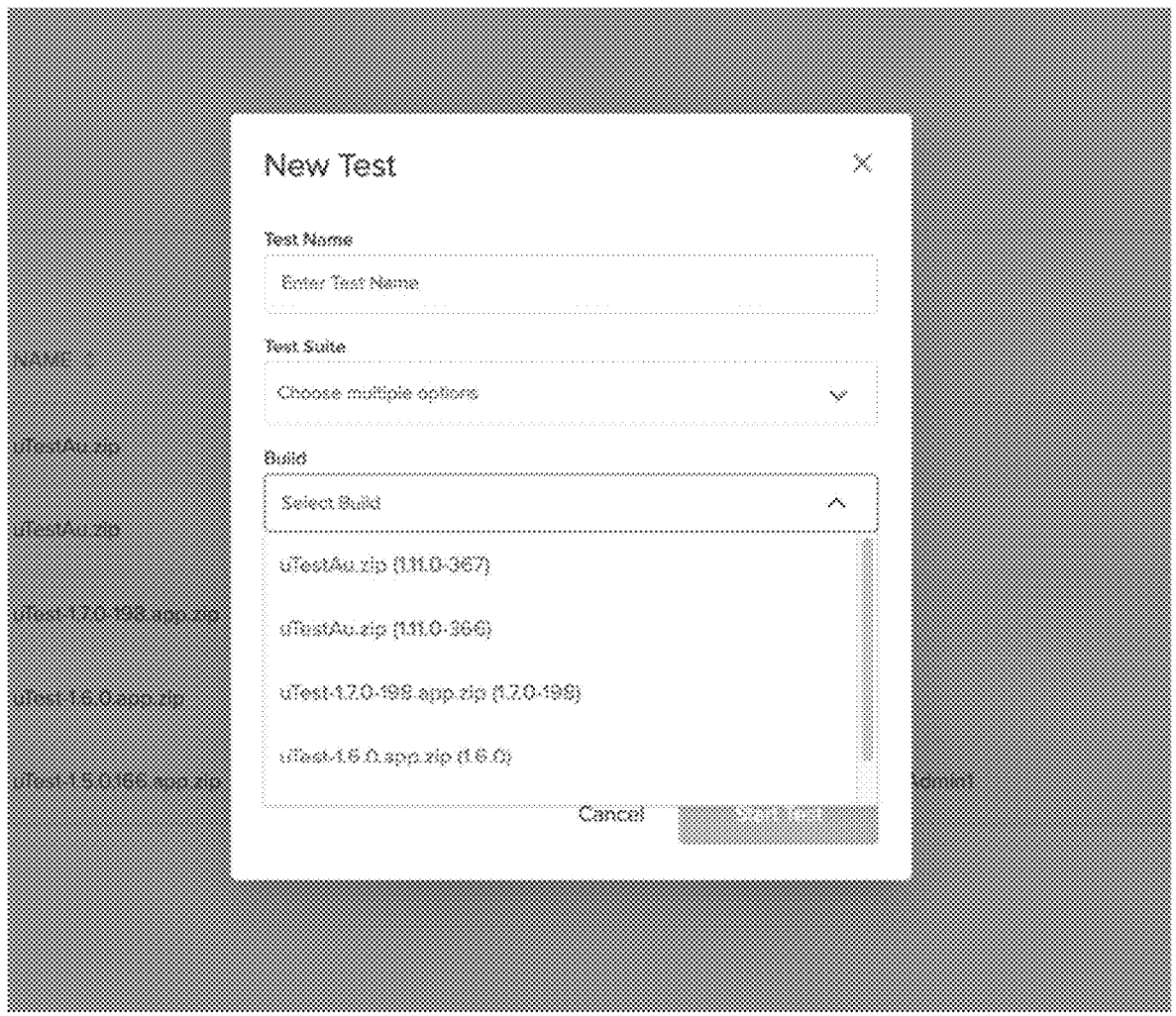
FIG. 5 is an example user interface, according to one embodiment.

As part of test generation/management, the UI can present options for defining companies each having associated tests, test suites, and/or schedules for testing created via the codeless automation interface. To execute the codeless automation functions, a user specifies a software build to be tested (e.g., FIG. 2), and the user may also define variables that they would like to use in the test recording or development (e.g., FIG. 3). FIG. 4 shows a display for specifying device information or selecting existing devices. The display can include devices that are emulations and real world devices (for executing created tests). For test recording, the user can specify device properties for a device emulation by creating devices for later selection, and the user then interacts with the emulated device/software build during recording. FIG. 5 illustrates user selections made for creating a new test, where the user names the test, creates, or assigns a test suite (a grouping of test), picks a loaded software build, device, and operating system.

Figure 6:
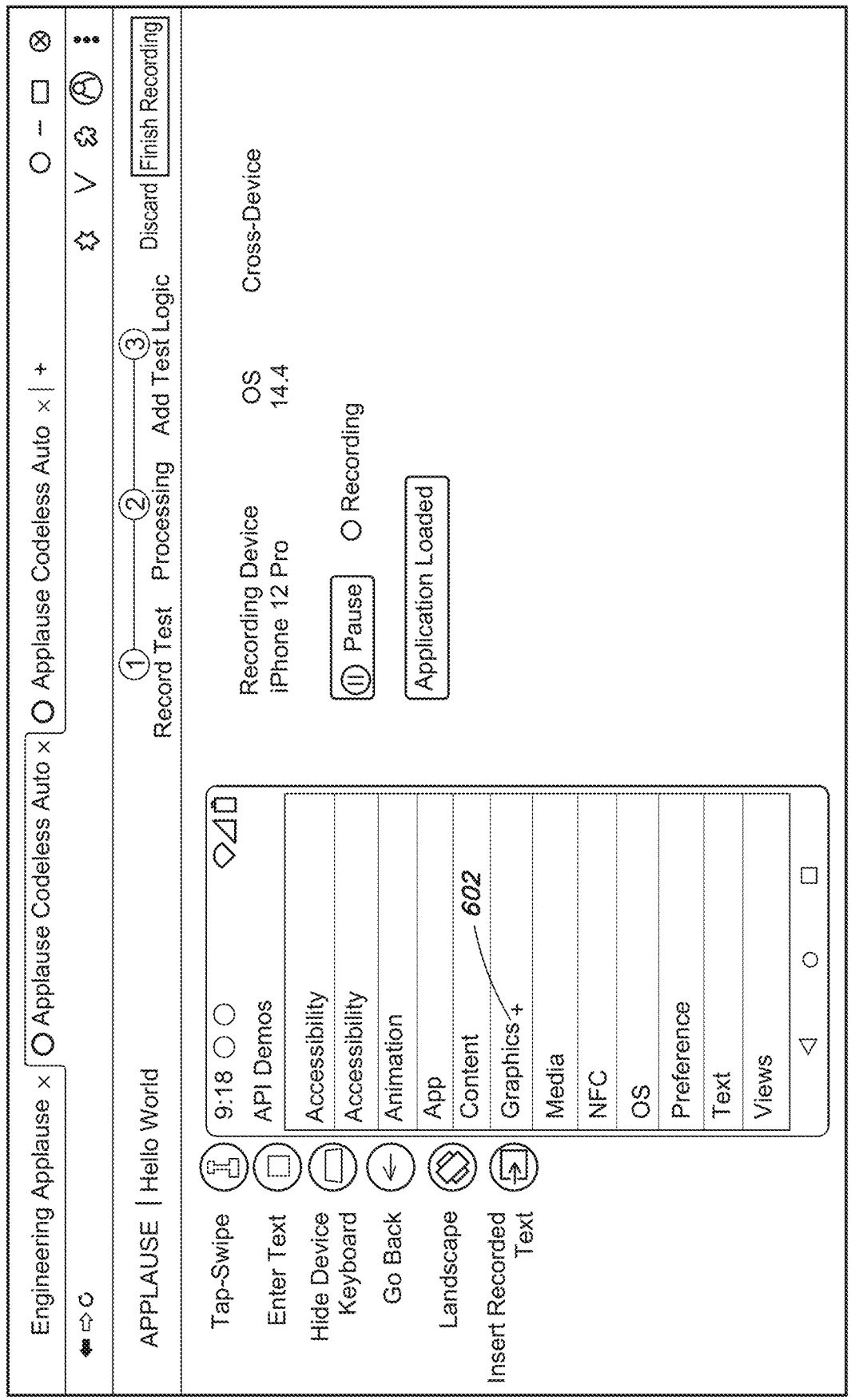
FIG. 6 is an example user interface, according to one embodiment.
Figure 7:
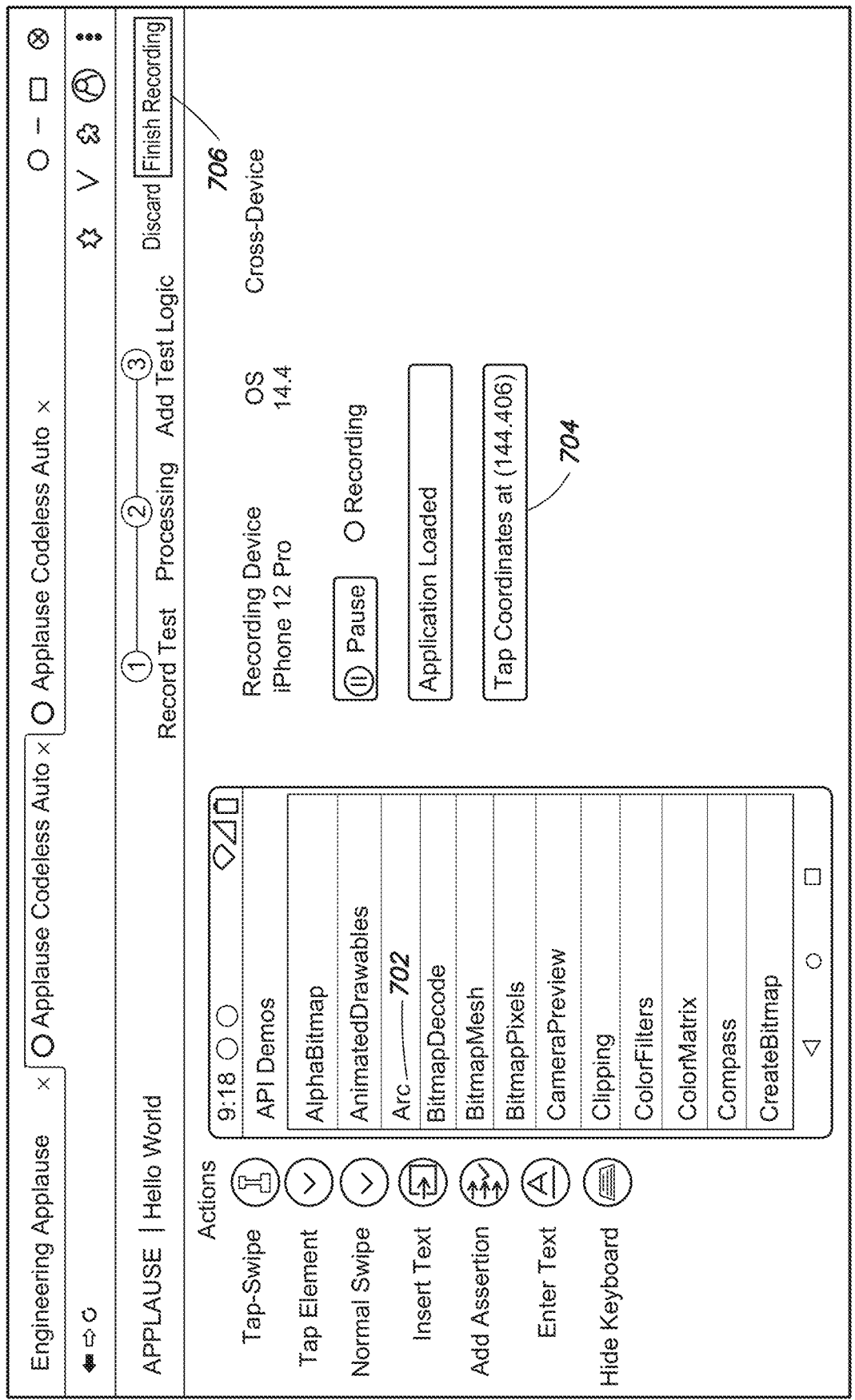
FIG. 7 is an example user interface, according to one embodiment.
Figure 8:
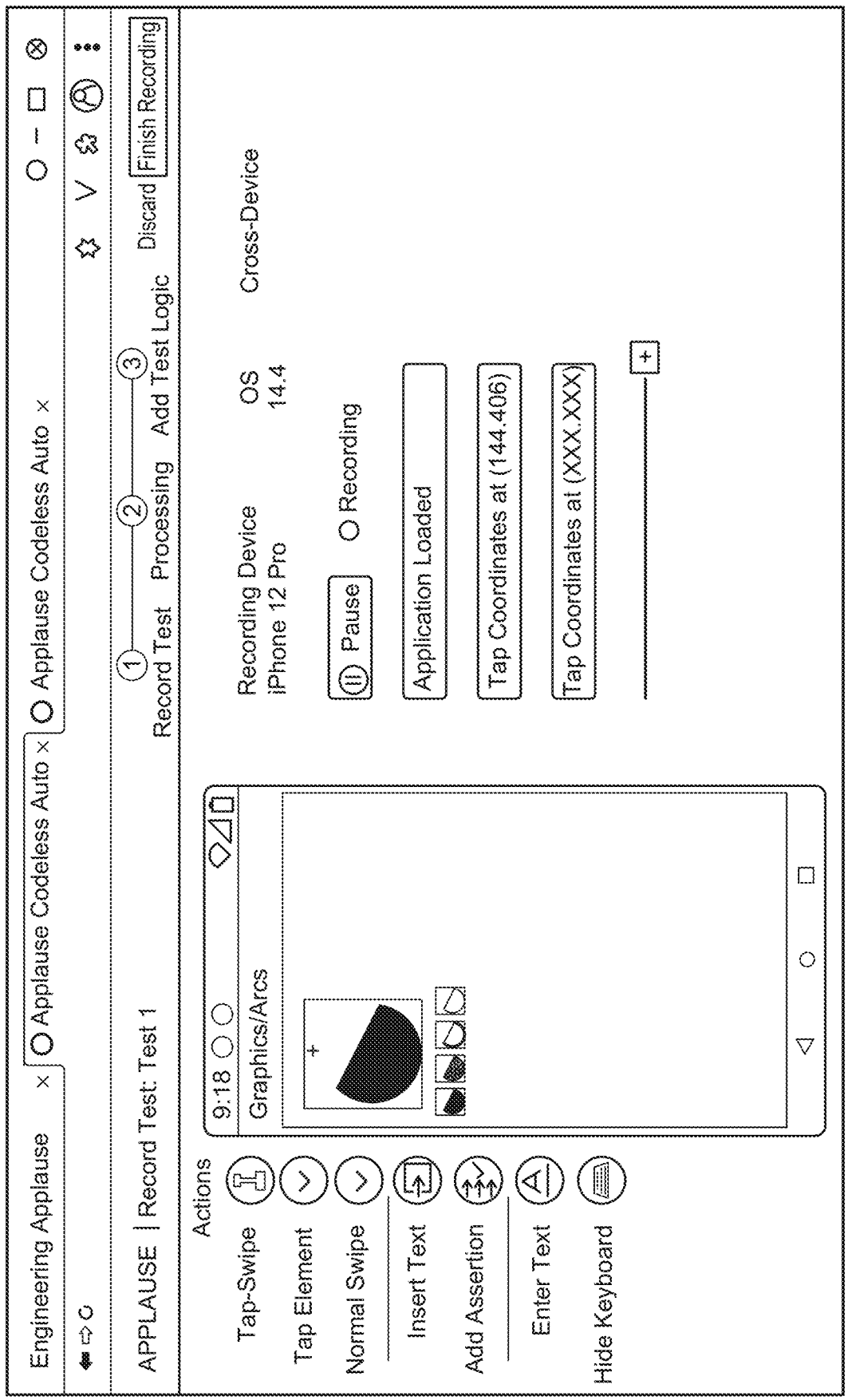
FIG. 8 is an example user interface, according to one embodiment.

FIG. 6 illustrates the start of a recording session, having loaded the application on a worker. In some examples, the user interface for the application being executed is present based on the accessibility elements that make up the display. Each element can be selected to form part of an automatically generated test. For example, selection of "graphics" 602 in the display, then "Arcs" (e.g., 702 FIG. 7) records those operations and shows the high level functions on the right side of the display (e.g., 704). FIG. 8 illustrates the streamed results that are generated in response to user selection of graphic and arcs, as an example of streaming the operations from the emulator to the user during a test recording. Different embodiments and different functions are also configured to stream the generated results from the emulator to the user during the test session. In further embodiments, the test recording can include action capture on the streamed screens, and trigger associated functions on the backend/emulator that is actually executing the application. The user can select finish recording once done, and the system is configured to convert the recorded session into test code. The translation into test code can include pulling the page source and coding replaying each action or activity that occurred as part of the recorded session.

Figure 9:
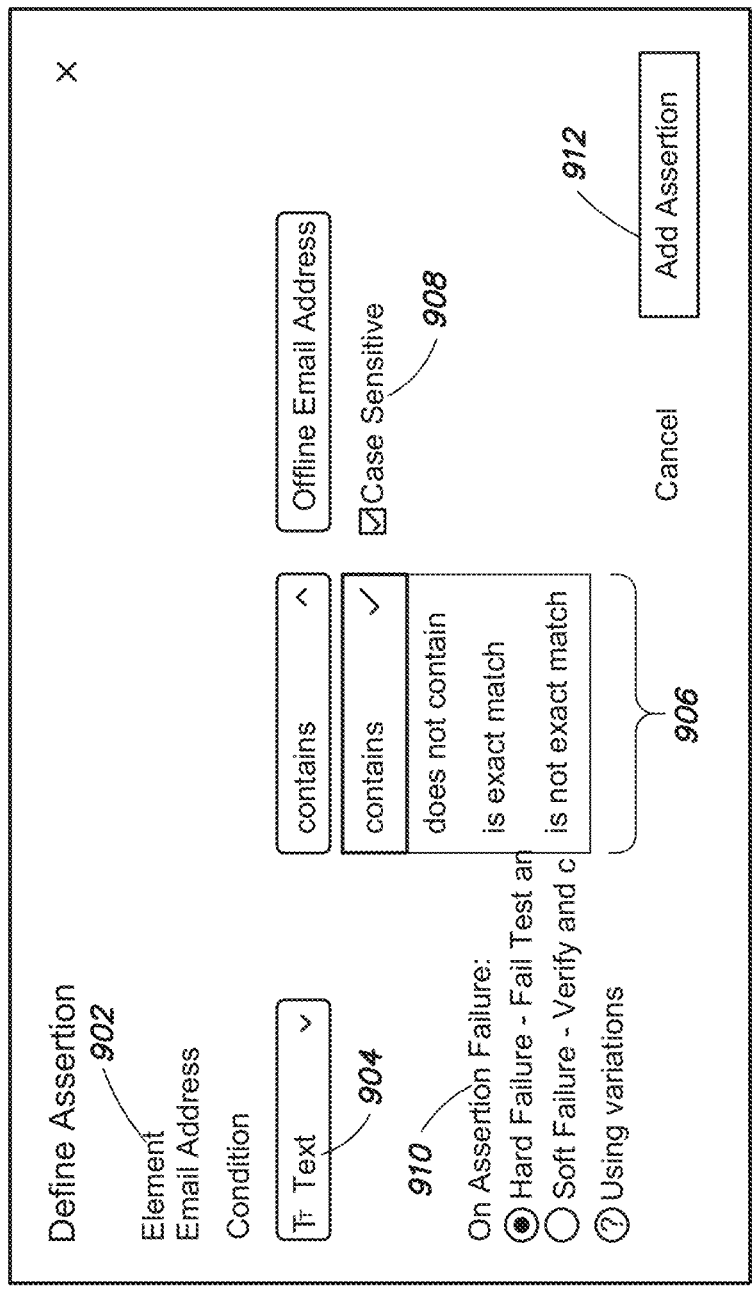
FIG. 9 is an example user interface, according to one embodiment.
Figure 10:
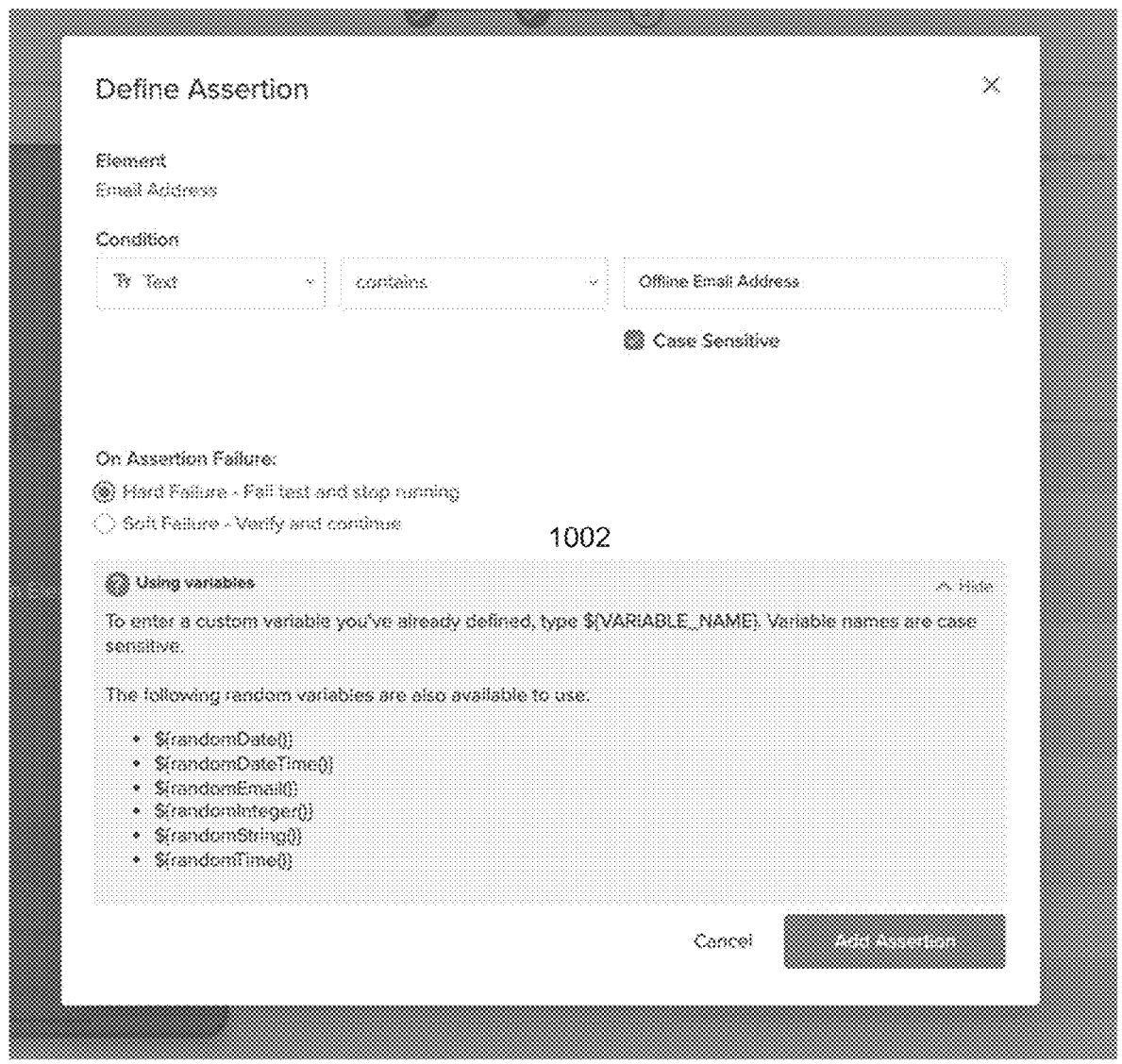
FIG. 10 is an example user interface, according to one embodiment.

Once the test is generated, the system provides options for updating the test. Some options include re-recording a test generation session. In further example, a user can select points within a test and re-record going forward, as well as re-record the entire test as needed. Additional options include, defining assertions within a generated test. FIG. 9 illustrates a screen capture of an assertion definition display. At 902, displayed is the element in the application on which an assertion can be defined. In some examples, the user selects a particular element and an add an assertion function for the selected element. At 904, the user can specify the subject of the condition "text" and what criteria will be evaluated at 906 (e.g., "contains," does not contain, is exact match, is not exact match, etc.). At 908, the build under test is displayed with options for making a condition case sensitive for text. In further embodiments, the user can specify the result of failed assertion at 910—hard failure (fail test) or soft failure (warning). Once final the user can save the assertion into the existing test (e.g., at 912—add assertion). FIG. 10 shows additional functionality for defining assertions to include variables. For example, variables defined (e.g., shown in FIG. 2) can be included in defined assertion always greater flexibility in automatically generated tests. Shown in FIG. 10 are ${randomDate}, ${randomDateTime}, ${randomEmail}, ${randomInteger}, ${randomString}, and ${randomTIme}, among other options.

Figure 11:
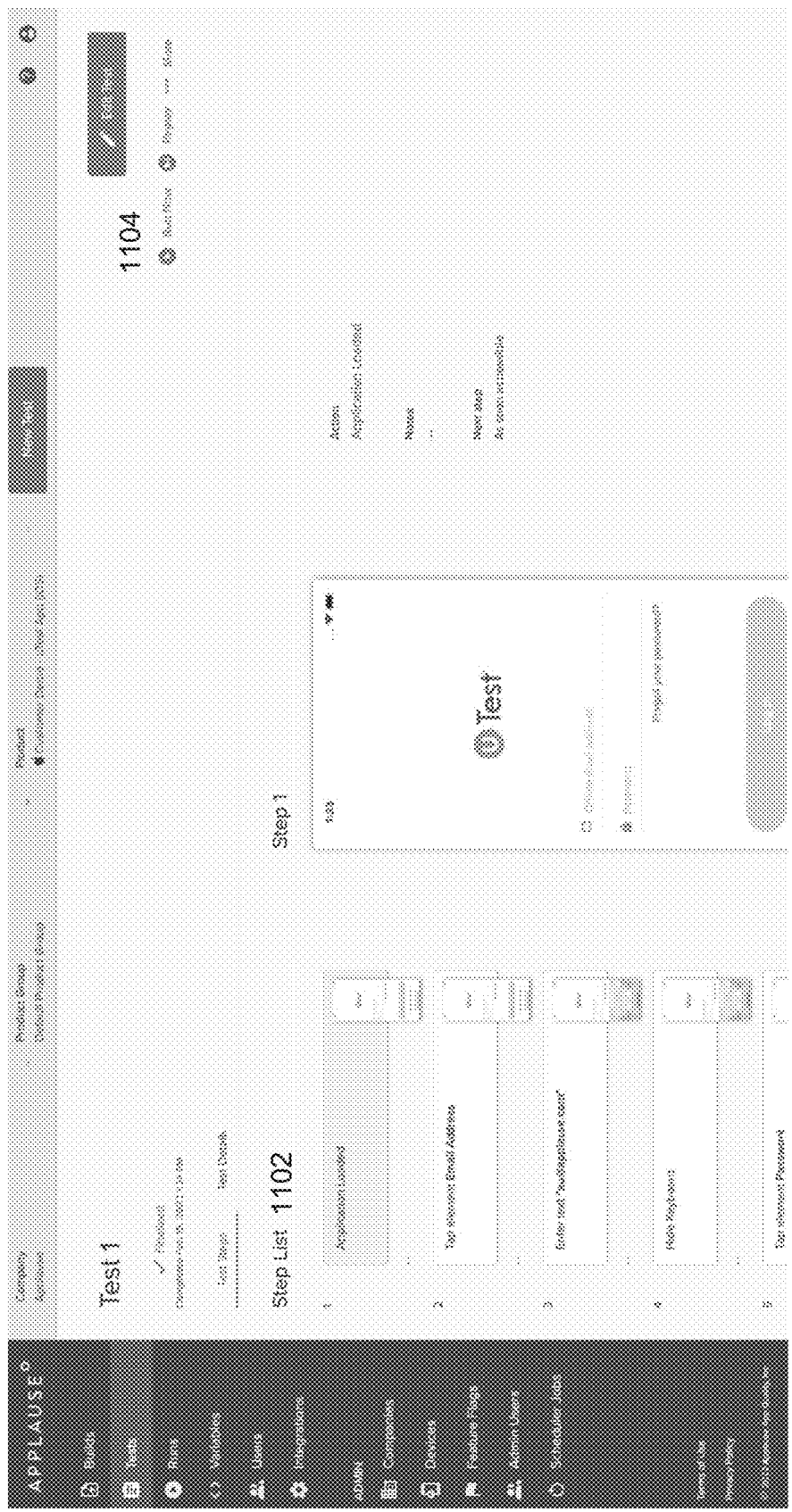
FIG. 11 is an example user interface, according to one embodiment.

FIG. 11 is a screen capture of a test result display. At 1102, the steps of the test sequence are shown. At 1104 displayed is a test step list. The test step list can include any added assertions as a step in the displayed test step list. As shown in FIG. 9, each assertion can include multiple options that can be selected for a value (e.g., text), a condition for the value (e.g., contains, does not, is exact match, not exact match, etc.), name of the filed being tested, etc.

Once defined the assertion becomes another step in the step list shown in FIG. 11. The test itself can be edited, run, deleted, via the options at 1104. Further screens can provide detailed information on the test and/or execution, including for example, the entire browser stack, execution information, test logs, network logs, device logs, Appium Logs, and/or App profiling, among other options. The system can be configured to provide test debug views that enable access to the underlying test code, statements, and/or conditions. In further embodiments, test can also be added into the step list for any other test stored on the system. The added test of one or more steps becomes part the displayed list of steps.

Figure 12A:
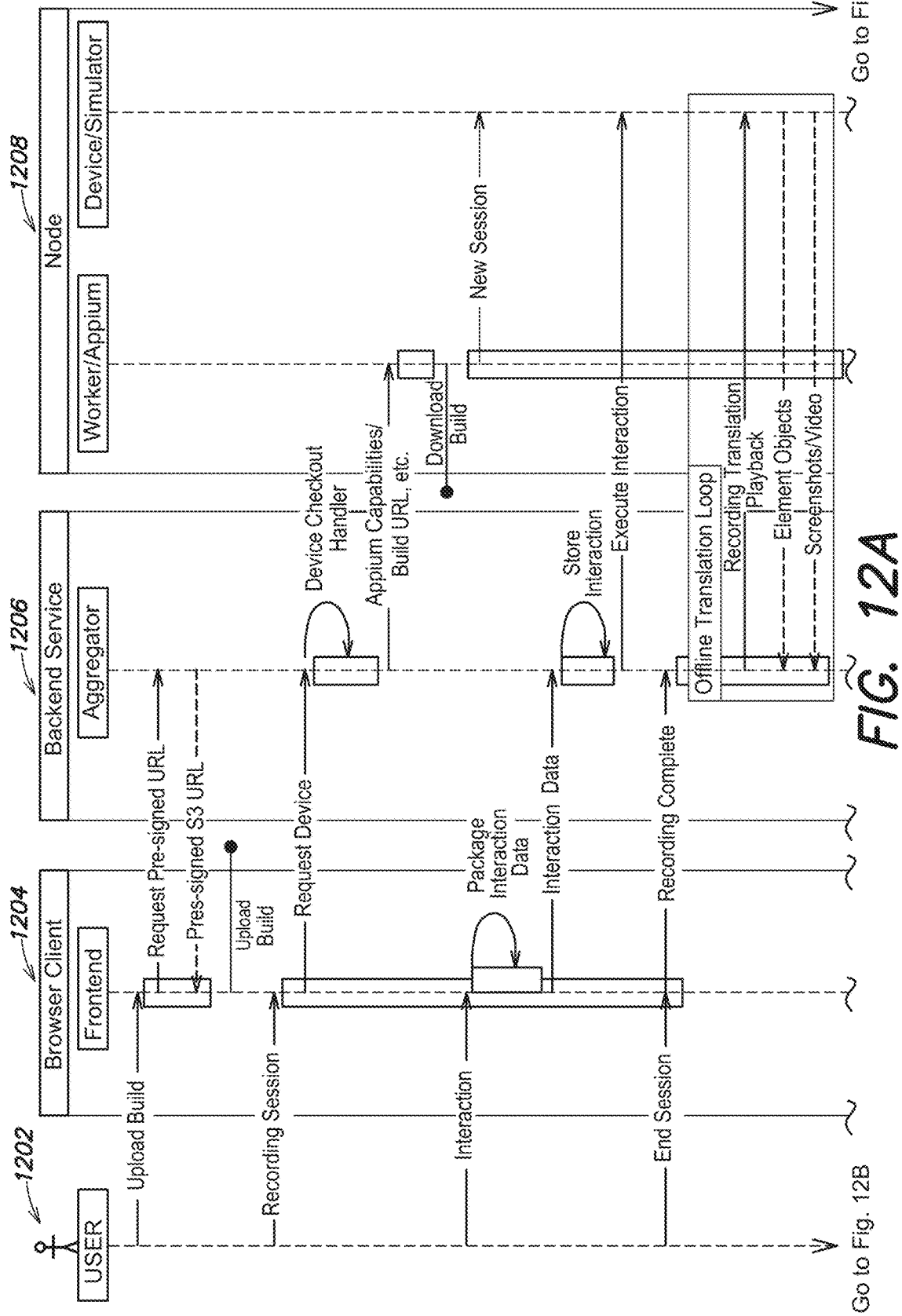
FIGS. 12A-B are an example process flow, according to one embodiment.
Figure 12B:
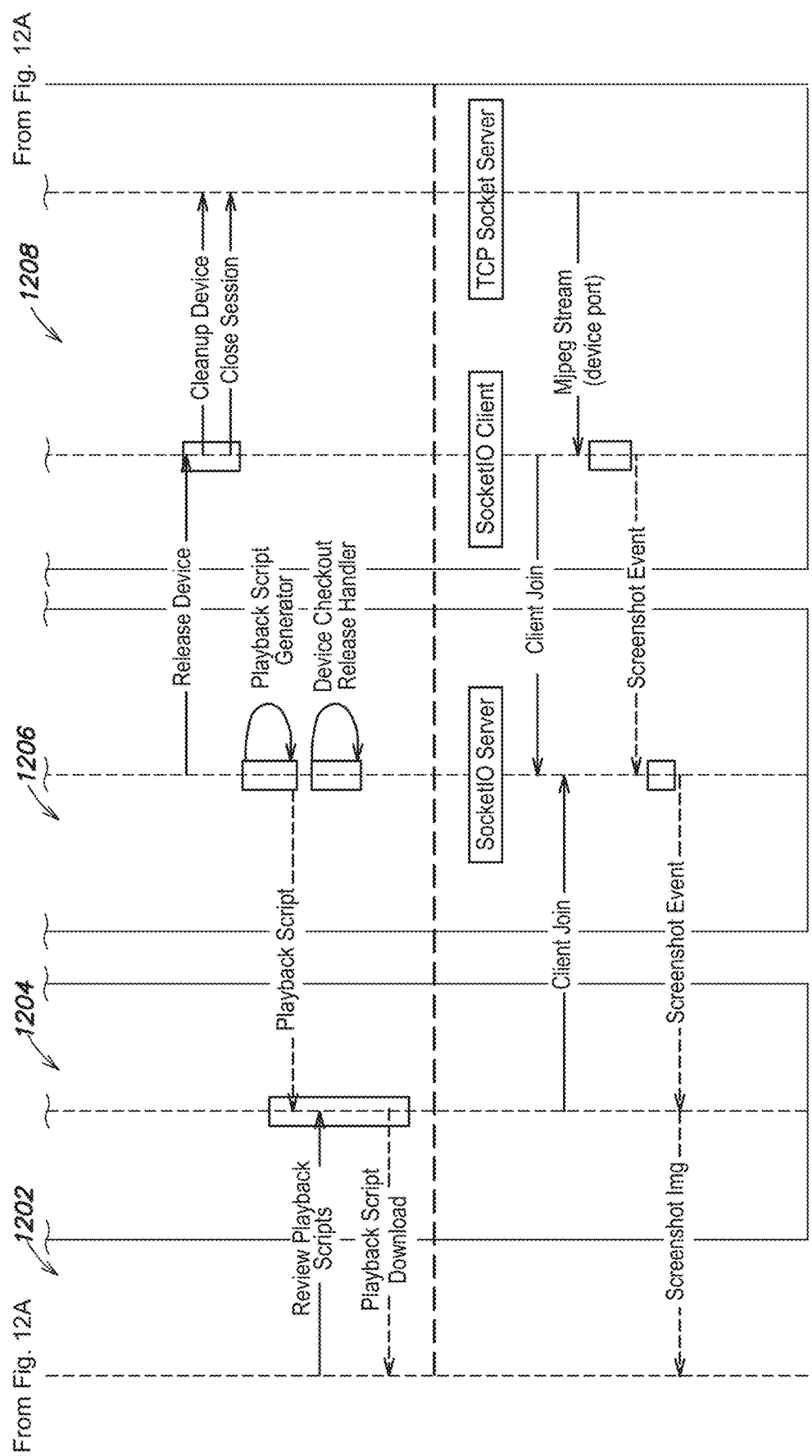
Figure 13:
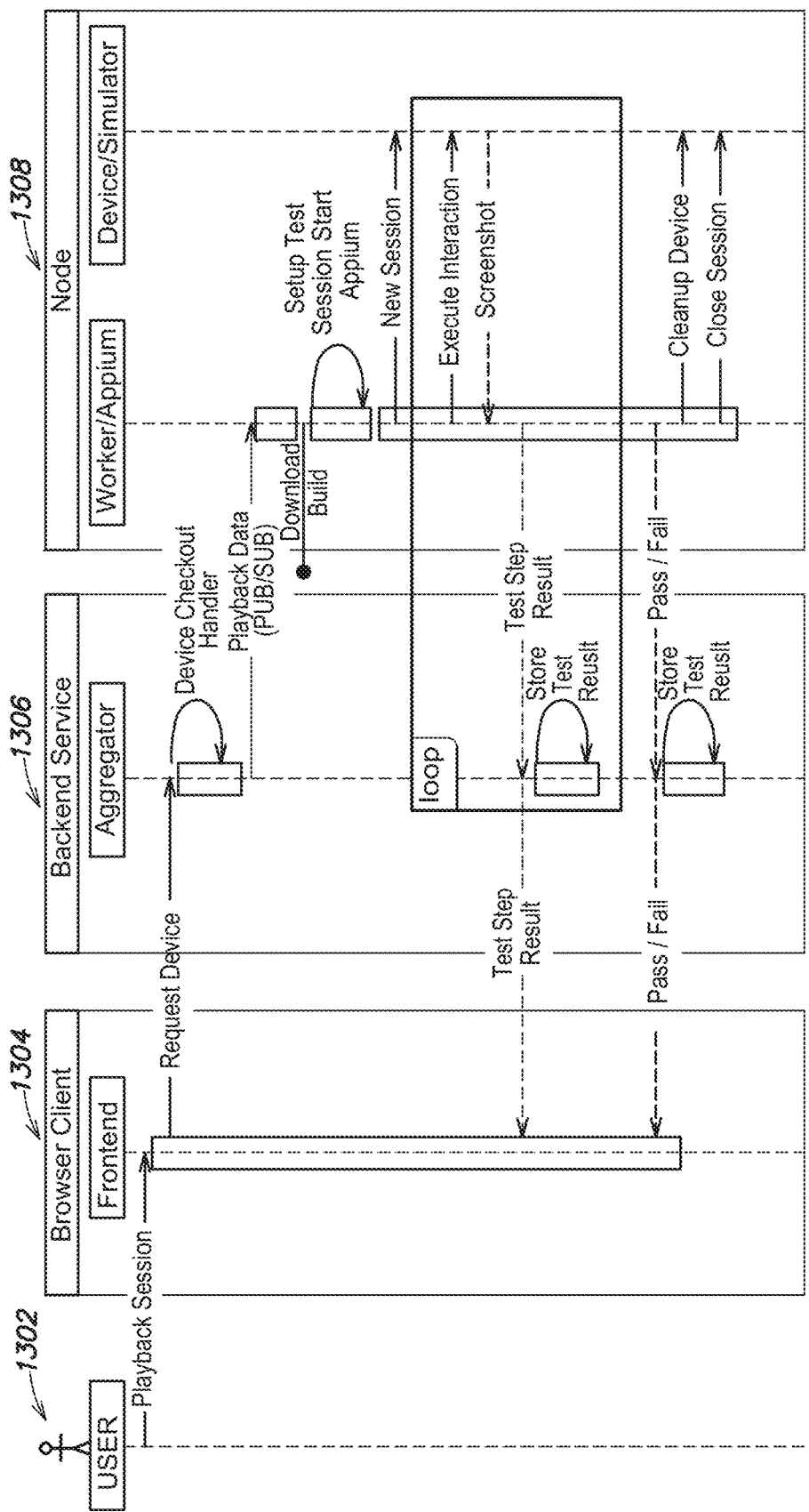
FIG. 13 is an example process flow, according to one embodiment.

FIGS. 12A-12B show a record session flow according to one embodiment. In FIGS. 12A-B, flows between the user 1202, a browser client for accessing the front end 1204, a backend services and device aggregator 1206, and a node hosting a worker and device/device simulator 1208 are shown. FIG. 13 shows a playback session flow according to one embodiment. In FIG. 13, flows between the user 1302, a browser client for accessing the front end 1304, a backend services and device aggregator 1306, and a node hosting a worker and device/device simulator 1308 are shown.

According to some embodiments, playback can be configured to occur from the backend or in other embodiments, the backend can communicate the script to the node to execute locally, where the node is configured to manage the test suite and report test status. In further embodiments, screenshot streaming can be configured to occur asynchronously from all operations after the frontend client connects and joins a device room. In some examples, the system is configured to allocate unique rooms based on an internal device identifier or Appium session identifier.

Figure 15:
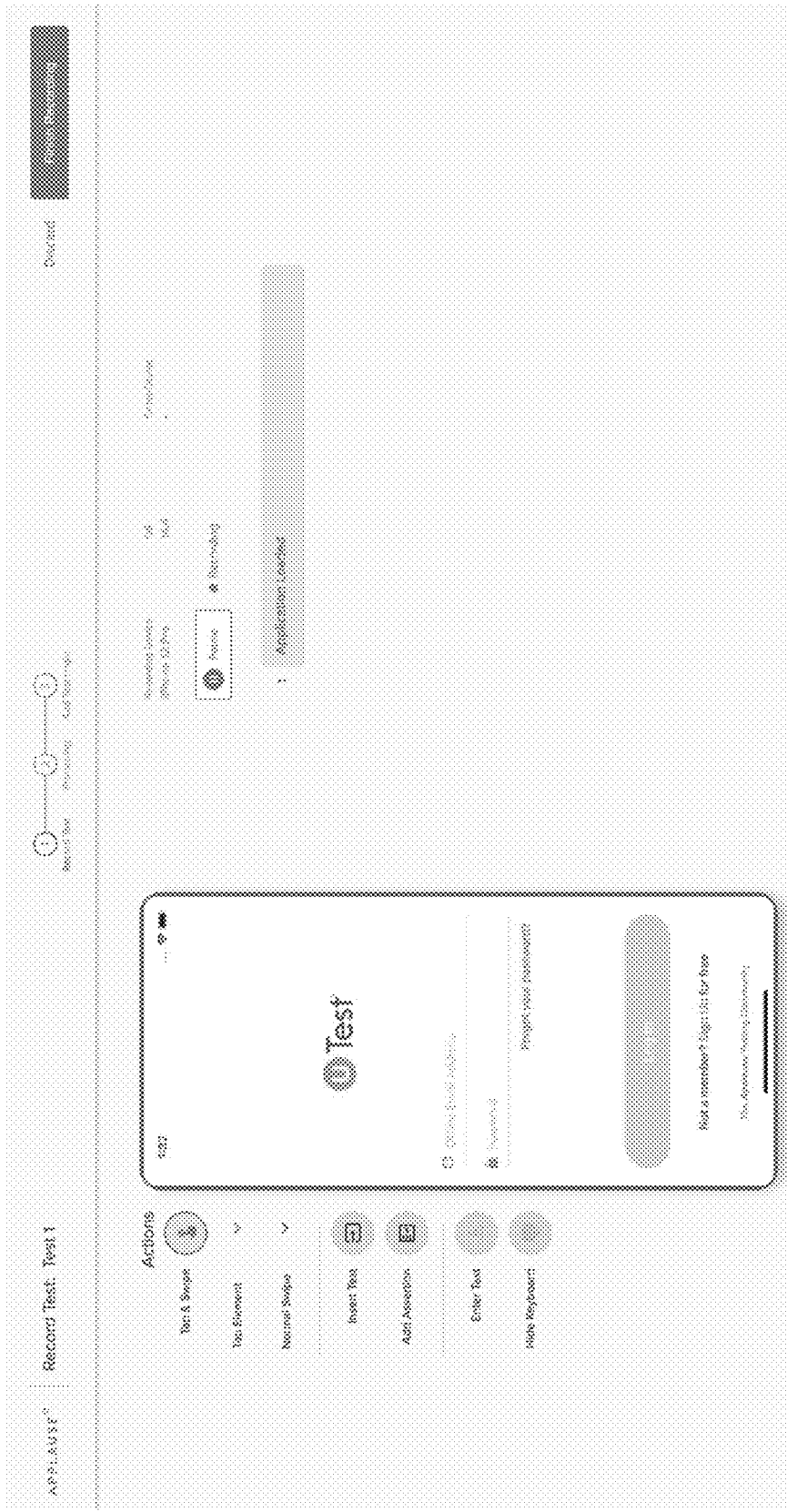
FIG. 15 is an example user interface, according to one embodiment.
Figure 16:
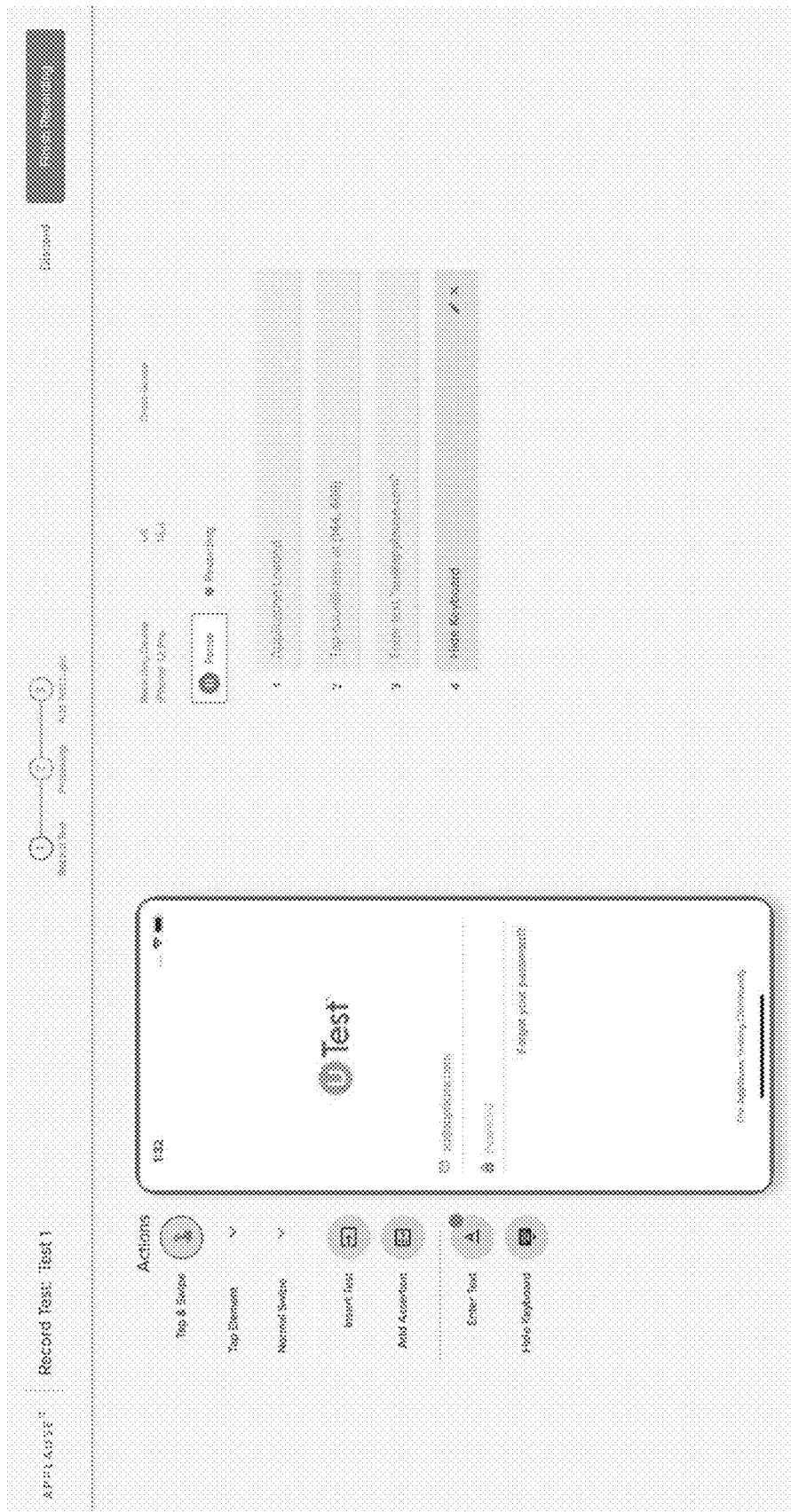
FIG. 16 is an example user interface, according to one embodiment.
Figure 17:
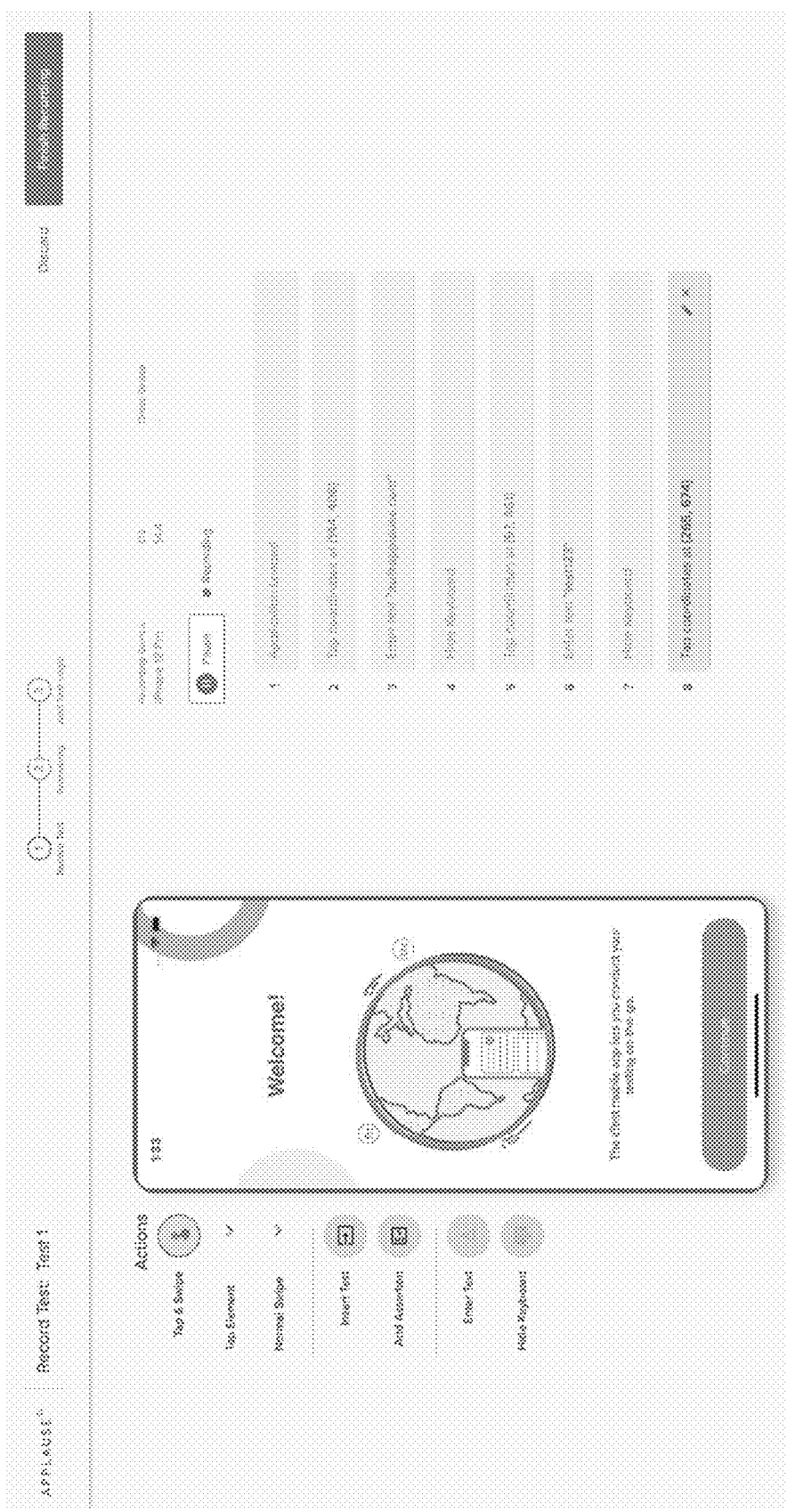
FIG. 17 is an example user interface, according to one embodiment.

FIGS. 15, 16, and 17 are screen captures of the user interface for an embodiment of an automated test system. FIG. 15 shows loading of an application for test. FIG. 16 shows a number of recorded actions performed by the user during a recording session. FIG. 17 shows streamed screen captures to the mobile device interface and respective actions recording during the various interactions performed by the user.

DPQ Platform and Codeless Integration Example Considerations

With the pace of change moving faster than ever, the quality of digital experiences and the speed at which they can be delivered has become paramount. Brands look to get exceptional digital assets into the hands of their end users quicker than competitors, or they risk losing market share. This requirement for quality at the speed of development has led test automation to take on greater importance across all industries. However, building and maintaining a complete automation framework takes time, and hiring SDETs (Software Development Engineer in Test)—who are high in demand and low in supply—can be cost-prohibitive.

In this environment, various embodiments are configured to provide codeless automation ("ACA"), which can be provided as a SaaS product. In various examples, ACA enables brands' employees to create test automation scripts without writing a single line of code (hence codeless). For example, with ACA, any user can simply pick a device of their choice (e.g., mobile device), and as they move through the test case, their actions are automatically recorded and the system automatically generates test automation code for subsequent use in testing. In further example, the ACA product can be configured to translate that recorded session into an automation script. This streamlined process results in increased speed, faster releases and reduced costs relative to conventional test approach and systems.

In further embodiments, the new software offerings integrating ACA features lower the barrier to entry to automation (e.g., by reducing complexity, by automating coding, etc.), accelerates the teams' ability to drive coverage (e.g., automating coverage testing) and allows them to mature and scale their test automation capabilities. In some examples, the system enables seamless integration with leading environments through an open API that teams can access to execute codeless test scripts on real devices (e.g., for native Android and iOS mobile apps), with full web-based support. For example, during operation all issues are automatically captured and added to clients' existing bug tracking systems, and scripts can be configured to comply with Appium and Selenium standards for ease of use.

The inventors have realized that the Applause Codeless Automation product is something unique in the low-code/no-code testing space, as it is built for the enterprise—the ACA delivers the most advanced mobile support (e.g., in the iOS and Android space). For example, ACA delivers value for multiple stakeholders—including those responsible for business applications who can use ACA to test apps without needing SDETs or outside help, and also including DevOps managers who can leverage ACA to import the automatically generated test scripts into their existing pipelines. By addressing testing needs throughout organizations, various embodiments of the ACA enable a system that not only reduces the costs typically associated with automation, but that also helps brands get to full-fledged automation capabilities faster.

Modifications and variations of the discussed embodiments will be apparent to those of ordinary skill in the art and all such modifications and variations are included within the scope of the appended claims.

Figure 14:
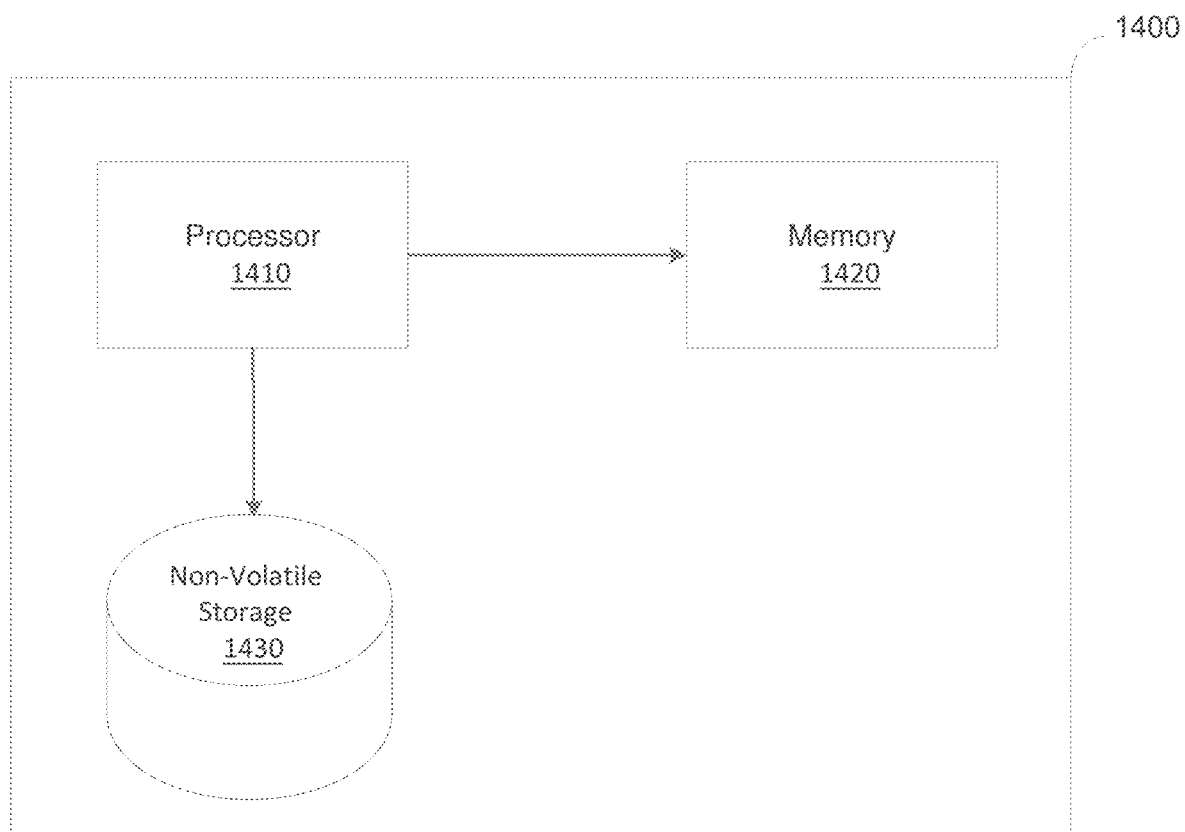
FIG. 14 is a block diagram of an example system that is improved over conventional approaches and systems based on the functions, operations, and algorithms disclosed, according to one embodiment.

An illustrative computer system on which the discussed functions, algorithms, and/or neural network can be implements is shown by way of computer system 1400, FIG. 14, which may be used in connection with any of the embodiments of the disclosure provided herein. The computer system 1400 may include one or more processors 1410 and one or more articles of manufacture that comprise non-transitory computer-readable storage media (e.g., memory 1420 and one or more non-volatile storage media 1430). The processor 1410 may control writing data to and reading data from the memory 1420 and the non-volatile storage device 1430 in any suitable manner. To perform any of the functionality described herein, the processor 1410 may execute one or more processor-executable instructions stored in one or more non-transitory computer-readable storage media (e.g., the memory 1420), which may serve as non-transitory computer-readable storage media storing processor-executable instructions for execution by the processor 1410.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms. As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed:

1. An automated testing system, the system comprising:
   at least one processor operatively connected to a memory, the at least one processor when executing is configured to:
   accept definition of at least one mobile device and an application to be tested;
   manage instantiation of at least one recording target matching the definition of the at least one mobile device, wherein the at least one recording target is loaded with the application;
   execute the application on the at least one recording target;
   start a recording session of activity performed by the application and the at least one recording target;
   trigger selections of operations in the application executing on the at least one recording target, responsive to selection made by a user in a testing display of screen captures, wherein the selection made by the user in the testing display is communicated from a remote system of the user to the at least one recording target;
   stream screen captures of the application under execution for display on the remote system of the user, wherein the screen captures show results of the triggered selections of the application executing on the at least one recording target; and
   automatically translate the activity performed by the application and the at least one recording target into a sequence of code that when executed replays the recording session against the application.

2. The system of claim 1, wherein the at least one processor is further configured to:
   organize a test session into groups of the activity in the activity performed by the application and the at least one recording target based on action elements shown in the display of the at least one recording target and a sequence of execution.

3. The system of claim 2, wherein the at least one processor is further configured to map the groups of the activity to the sequence of code.

4. The system of claim 3, wherein the at least one processor is further configured to:
   enable the user to optimize a recorded session; and
   replace associated portions of the sequence of code with newly generated translations.

5. The system of claim 1, wherein the at least one processor is further configured to execute a recording or replay session against at least one emulation of the recording target or at least one real device defined by the recording target.

6. The system of claim 1, wherein the at least one processor is further configured to manage execution of the sequence of code against a plurality of real mobile devices loaded with the application.

7. The system of claim 1, wherein the at least one processor is further configured to define schedules for execution of the sequence of code against a plurality of real mobile devices.

8. The system of claim 1, wherein the at least one processor is further configured to present the testing display to the user via a web interface.

9. The system of claim 8, wherein the at least one processor is further configured to generate a display of the at least one recording target of the at least one mobile device based on streamed captures from the at least one recording target and a display of a sequence of activity performed on the at least one recording target.

10. The system of claim 9, wherein the at least one processor is configured to trigger execution of the displayed sequence of activity on at least one real mobile device using at least a portion of the sequence of code associated with a selection within the displayed sequence of activity.

11. The system of claim 1, wherein the at least one processor is further configured to transcribe the recording session into human readable test case steps.

12. A computer implemented method for automated testing, the method comprising:
   accepting, by at least one processor, definition of at least one mobile device and an application to be tested;
   managing, by the at least one processor, instantiation of at least one recording target matching the definition of the at least one mobile device, wherein the at least one recording target is loaded with the application;
   executing, by the at least one processor, the application on the at least one recording target;
   starting, by the at least one processor, a recording session of activity performed by the application and the at least one recording target;
   triggering, by the at least one processor, selections of operations in the application executing on the at least one recording target, responsive to selection made by a user in a testing display of screen captures, wherein the selection made by the user in the testing display is communicated from a remote system of the user to the at least one recording target;
   streaming, by the at least one processor, screen captures of the application under execution for display on the remote system of the user, wherein the screen captures show results of the triggered selections of the application executing on the at least one recording target; and
   automatically translating, by the at least one processor, the activity performed by the application and the at least one recording target into a sequence of code that when executed replays the recording session against the application.

13. The method of claim 12, wherein the method further comprises:
   organizing, by the at least one processor, a test session into groups of the activity in the activity performed by the application and the at least one recording target based on action elements shown in the display of the at least one recording target and a sequence of execution.

14. The method of claim 13, wherein the method further comprises mapping, by the at least one processor, the groups of the activity to the sequence of code.

15. The method of claim 14, wherein the method further comprises:
   enabling, by the at least one processor, the user to optimize a recorded session; and replacing, by the at least one processor, associated portions of the sequence of code with newly generated translations.

16. The method of claim 12, wherein the method further comprises executing, by the at least one processor, a recording or replay session against at least one emulation of the recording target or at least one real device defined by the recording target.

17. The method of claim 12, wherein the method further comprises managing, by the at least one processor, execution of the sequence of code against a plurality of real mobile devices loaded with the application.

18. The method of claim 12, wherein the method further comprises defining, by the at least one processor, schedules for execution of the sequence of code against a plurality of real mobile devices.

19. The method of claim 12, wherein the method further comprises presenting, by the at least one processor, the testing display to the user via a web interface.

20. The method of claim 19, wherein the method further comprises generating, by the at least one processor, a display of the at least one recording target of the at least one mobile device based on streamed captures from the at least one recording target and a display of a sequence of activity performed on the at least one recording target.

21. The method of claim 20, wherein the method further comprises triggering, by the at least one processor, execution of the displayed sequence of activity on at least one real mobile device using at least a portion of the sequence of code associated with a selection within the displayed sequence of activity.

22. The method of claim 12, wherein the method further comprises transcribing, by the at least one processor, the recording session into human readable test case steps.

* * * * *